(12) United States Patent
Oklejas, Jr.

(10) Patent No.: US 11,203,535 B2
(45) Date of Patent: *Dec. 21, 2021

(54) METHOD AND SYSTEM FOR OPERATING A HIGH RECOVERY SEPARATION PROCESS

(71) Applicant: FLUID EQUIPMENT DEVELOPMENT COMPANY, LLC, Monroe, MI (US)

(72) Inventor: Eli Oklejas, Jr., Newport, MI (US)

(73) Assignee: Fluid Equipment Development Company, LLC, Monroe, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 17/233,661

(22) Filed: Apr. 19, 2021

(65) Prior Publication Data
US 2021/0238062 A1 Aug. 5, 2021

Related U.S. Application Data

(60) Division of application No. 17/140,615, filed on Jan. 4, 2021, now Pat. No. 11,046,594, which is a
(Continued)

(51) Int. Cl.
*C02F 1/44* (2006.01)
*B01D 61/10* (2006.01)
(Continued)

(52) U.S. Cl.
CPC ............ *C02F 1/441* (2013.01); *B01D 61/022* (2013.01); *B01D 61/025* (2013.01); *B01D 61/06* (2013.01);
(Continued)

(58) Field of Classification Search
CPC .. C02F 1/441; C02F 2303/10; C02F 2301/08; C02F 2103/08; C02F 2209/40;
(Continued)

(56) References Cited

U.S. PATENT DOCUMENTS

| 4,966,708 A | 10/1990 | Oklejas et al. |
| 4,983,305 A | 1/1991 | Oklejas et al. |

(Continued)

FOREIGN PATENT DOCUMENTS

| CN | 104533802 | 4/2015 |
| CN | 104533802 A | 4/2015 |

(Continued)

OTHER PUBLICATIONS

International Search Report and Written Opinion for PCT/US2018/052576 dated Mar. 18, 2019.
(Continued)

*Primary Examiner* — Krishnan S Menon
(74) *Attorney, Agent, or Firm* — Harness Dickey & Pierce PLC

(57) ABSTRACT

A turbocharger includes a turbocharger housing having an impeller housing comprising a circular cross-section. A main nozzle is disposed within the turbocharger housing communicating a first portion of a fluid stream to a first volute. A first auxiliary channel and a first auxiliary nozzle communicating a second portion of the fluid stream to the first volute. The first auxiliary nozzle is downstream of the main nozzle. A second auxiliary channel and a second auxiliary nozzle communicate a third portion of the fluid stream to the first volute. The second auxiliary nozzle is downstream of the first auxiliary nozzle. A valve assembly is selectively coupling the first auxiliary channel to the first auxiliary nozzle and the second auxiliary channel to the second auxiliary nozzle.

28 Claims, 23 Drawing Sheets

Related U.S. Application Data continuation-in-part of application No. 16/848,236, filed on Apr. 14, 2020, now Pat. No. 10,882,765, which is a continuation-in-part of application No. 16/411,198, filed on May 14, 2019, now Pat. No. 10,703,651, which is a continuation of application No. 16/138,291, filed on Sep. 21, 2018, now Pat. No. 10,336,630.

(60) Provisional application No. 62/562,694, filed on Sep. 25, 2017.

(51) Int. Cl.
| | | |
|---|---|---|
| *B01D 61/08* | (2006.01) | |
| *B01D 61/02* | (2006.01) | |
| *B01D 61/06* | (2006.01) | |
| *B01D 61/12* | (2006.01) | |
| *C02F 103/08* | (2006.01) | |

(52) U.S. Cl.
CPC ............ *B01D 61/08* (2013.01); *B01D 61/10* (2013.01); *B01D 61/12* (2013.01); *B01D 2311/14* (2013.01); *B01D 2311/16* (2013.01); *B01D 2313/083* (2013.01); *B01D 2313/18* (2013.01); *B01D 2313/243* (2013.01); *B01D 2313/246* (2013.01); *B01D 2317/022* (2013.01); *B01D 2317/04* (2013.01); *B01D 2317/06* (2013.01); *C02F 2103/08* (2013.01); *C02F 2201/005* (2013.01); *C02F 2209/40* (2013.01); *C02F 2301/08* (2013.01); *C02F 2303/10* (2013.01)

(58) Field of Classification Search
CPC ... C02F 2201/005; B01D 61/06; B01D 61/10; B01D 61/025; B01D 61/12; B01D 61/08; B01D 61/022; B01D 2317/06; B01D 2317/04; B01D 2317/022; B01D 2313/083; B01D 2313/246; B01D 2311/14; B01D 2313/18; B01D 2313/243; B01D 2311/16

See application file for complete search history.

(56) References Cited

U.S. PATENT DOCUMENTS

| | | |
|---|---|---|
| 5,049,045 A | 9/1991 | Oklejas et al. |
| 6,139,740 A | 10/2000 | Oklejas |
| 6,345,961 B1 | 2/2002 | Oklejas, Jr. |
| 8,691,086 B2 | 4/2014 | Oklejas, Jr. |
| 10,336,630 B2 | 7/2019 | Oklejas, Jr. |
| 10,703,651 B2 | 7/2020 | Oklejas, Jr. |
| 2004/0178145 A1 | 9/2004 | Herrington et al. |
| 2007/0181473 A1 | 8/2007 | Manth et al. |
| 2007/0289904 A1 | 12/2007 | Oklejas |
| 2008/0105617 A1 | 5/2008 | Oklejas |
| 2011/0198290 A1 | 8/2011 | Oklejas, Jr. |
| 2013/0277310 A1 | 10/2013 | Okeljas, Jr. |
| 2014/0238938 A1 | 8/2014 | Sarp et al. |
| 2020/0131056 A1 | 4/2020 | Oklejas, Jr. |

FOREIGN PATENT DOCUMENTS

| | | |
|---|---|---|
| CN | 106132514 | 11/2016 |
| CN | 106132514 A | 11/2016 |

OTHER PUBLICATIONS

Chinese Office Action dated Oct. 22, 2020 in corresponding Chinese Application No. 201880058810.9.

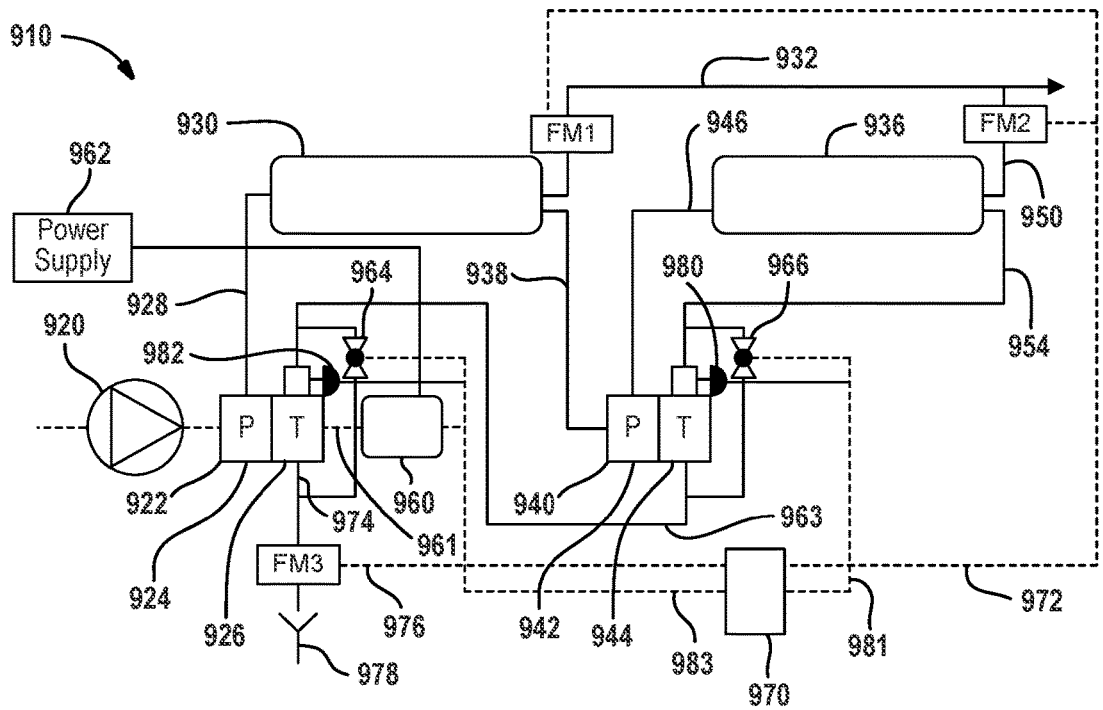

FIG. 9A

Interstage Turbo 940

| Pt | Aux | Bypass | Comments | |
|---|---|---|---|---|
| Qp high | ↓ | ↑ | Reduce boost | Loop 1 |
| Qp low | ↑ | ↓ | Increase boost | Loop 1 |
| Qb high | ↓ | ↓ | Increase brine flow restriction | Loop 2 |
| Qb low | ↑ | ↑ | Reduce brine flow restriction | Loop 2 |

FIG. 9B

Feed Turbo 922

| Pt | Aux | Bypass | Comments | |
|---|---|---|---|---|
| Qp high | ↓ | ↑ | Reduce boost | Loop 3 |
| Qp low | ↑ | ↓ | Increase boost | Loop 3 |
| Qb high | ↓ | ↓ | Increase brine flow restriction | Loop 4 |
| Qb low | ↑ | ↑ | Reduce brine flow restriction | Loop 4 |

FIG. 9C

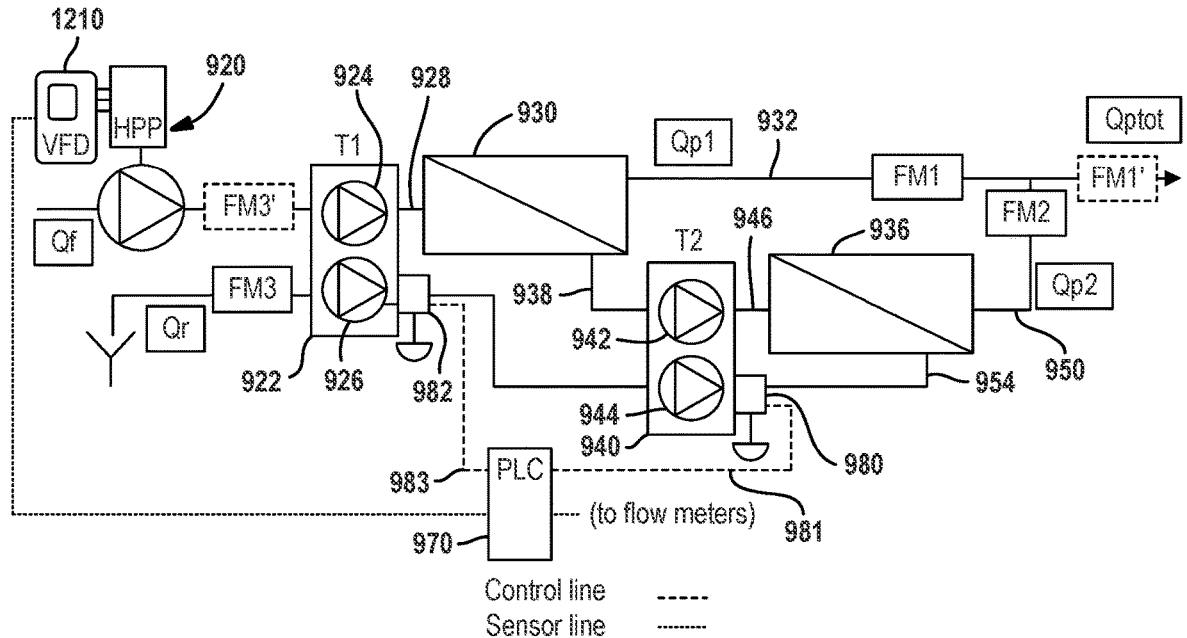

FIG. 12A

| Condition | PLC Response | Turbo or HPP Change | System change |
|---|---|---|---|
| Optpt high | Reduce HPP VFD Hz | HPP speed decreases | Feed pressure decreases |
| Optpt low | Increase HPP VFD Hz | HPP speed increases | Feed pressure increases |
| Op2 high | Close actuator T2 | Close turbine nozzle T2 | Brine resistance increases |
| Op2 low | Open actuator T2 | Open turbine nozzle T2 | Brine resistance decreases |
| Qr high | Close actuator T1 | Close turbine nozzle T1 | Brine resistance increases |
| Qr low | Open actuator T1 | Open turbine nozzle T1 | Brine resistance decreases |

FIG. 12B

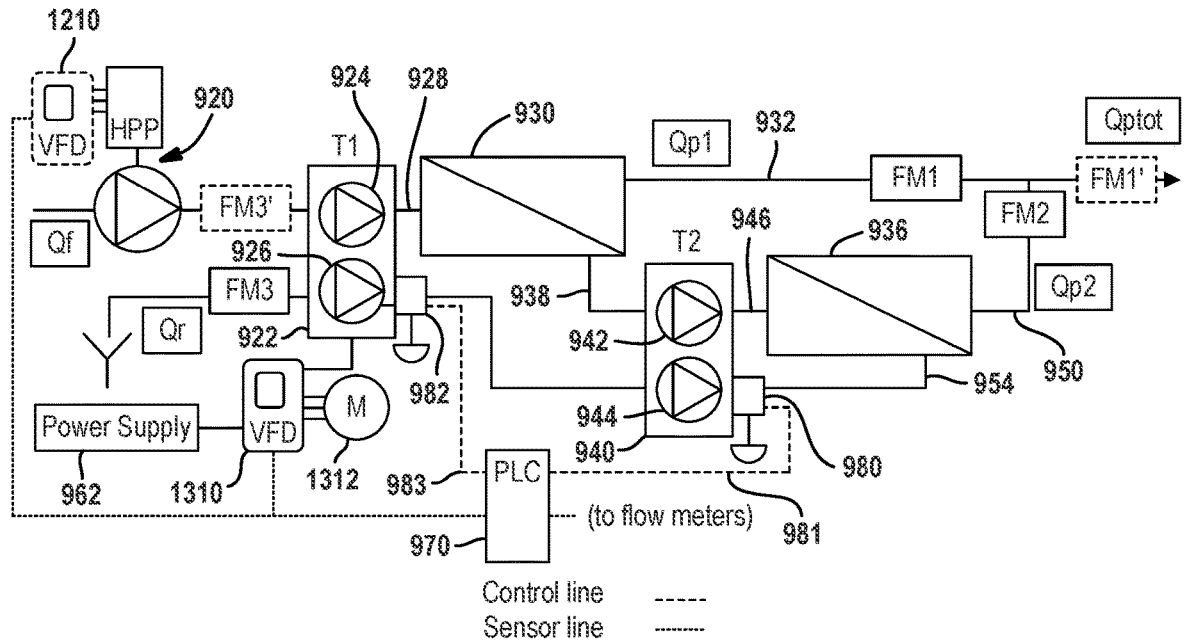

FIG. 13A

| Condition | PLC Response | Turbo or HPP Change | System change |
|---|---|---|---|
| Optpt high | Reduce HPP VFD Hz | HPP speed decreases | Feed pressure decreases |
| Optpt low | Increase HPP VFD Hz | HPP speed increases | Feed pressure increases |
| Op2 high | Close actuator T2 | Close turbine nozzle T2 | Brine resistance increases |
| Op2 low | Open actuator T2 | Open turbine nozzle T2 | Brine resistance decreases |
| Qr high | Close actuator T1 | Close turbine nozzle T1 | Brine resistance increases |
| Qr low | Open actuator T1 | Open turbine nozzle T1 | Brine resistance decreases |

FIG. 13B

| Condition | PLC Response | Turbo or HPP Change | System change | PLC Loop |
|---|---|---|---|---|
| Optpt high | Reduce HPP VFD Hz | HPP speed decreases | Feed pressure decreases | Control Loop 1 |
| Optpt low | Increase HPP VFD Hz | HPP speed increases | Feed pressure increases | |
| OpX high | Close actuator TX | Close turbine nozzle TX | Brine resistance increases | Control Loop X |
| OpX low | Open actuator TX | Open turbine nozzle TX | Brine resistance decreases | |
| Qr high | Close actuator T1 | Close turbine nozzle T1 | Brine resistance increases | Control Loop 1A |
| Qr low | Open actuator T1 | Open turbine nozzle T1 | Brine resistance decreases | |

FIG. 15B

METHOD AND SYSTEM FOR OPERATING A HIGH RECOVERY SEPARATION PROCESS

CROSS-REFERENCE TO RELATED APPLICATIONS

This application is a divisional of U.S. patent application Ser. No. 17/140,615, filed Jan. 4, 2021, which is a continuation-in-part of U.S. patent application Ser. No. 16/848,236, filed Apr. 14, 2020 (now U.S. Pat. No. 10,882,765) which is a continuation-in-part of U.S. patent application Ser. No. 16/411,198 filed on May 14, 2019 (now U.S. Pat. No. 10,703,651), which is a continuation of U.S. patent application Ser. No. 16/138,291, filed Sep. 21, 2018 (now U.S. Pat. No. 10,336,630), which is a non-provisional application of U.S. Application No. 62/562,694, filed Sep. 25, 2017, the disclosures of which are incorporated by reference herein.

TECHNICAL FIELD

The present disclosure relates generally to fluid separation systems, and, more specifically, to a method and system for using multiple energy recovery device for multiple stages of fluid separation.

BACKGROUND

The statements in this section merely provide background information related to the present disclosure and may not constitute prior art.

Reverse osmosis systems typically use one or more membrane housings that have one or more membranes therein that are used to extract an essentially pure fluid from a solution. The desalination reverse osmosis membranes receive feed fluid from brackish or sea water and extract fresh water therefrom. Fresh water is extracted or separated when the pressure of the feed fluid exceeds the osmotic pressure of the fluid which allows permeate or product fluid to cross the semi-permeable reverse osmosis membrane. The fluid that is left on the input side to the membrane becomes higher in salt concentration because fresh water that travels through the membrane does not include the salt. The water that passes through the membrane is referred to as permeate. The pressure required to produce fresh water is proportional to the concentration of the total dissolved solids (TDS) in this feed solution within the reverse osmosis housing. For typical ocean water, the concentration is about 35,000 parts per million (ppm) and the corresponding osmotic pressure is about 450 pounds per square inch (psi) (3,102 kPa). For 70,000 ppm feed fluid, the osmotic pressure approximately doubles to 900 psi (about 6,205 kPa). A typical seawater reverse osmosis system uses a series of membranes that recover up to about 45% of the fresh water and generate about 55% concentrate brine from the original volume of seawater. The net driving pressure (NDP) equals the feed pressure minus the osmotic pressure. The net driving pressure is the pressure energy available to drive pure fluid across the membrane.

Referring now to FIG. 1A, a reverse osmosis system 10 according to the prior art includes a membrane array 12 that generates a permeate stream through permeate pipe 14 and a brine stream through a brine pipe 16 from a feed stream in a feed pipe 18. The feed stream originates from a source 19 typically includes brackish or sea water. A feed pump 20 coupled to a motor 22 pressurizes the feed stream 18 to a required pressure, and the feed stream 18 enters the membrane array 12 at the required pressure.

The membrane array 12 includes a membrane housing or pressure vessel 24 and a membrane 26. The portion of the feed stream 18 that flows through the membrane 26 before exiting the membrane array 12 forms the permeate stream 14 that exits through the permeate pipe 14. The portion of the feed stream 18 that does not flow through the membrane 26 before exiting the membrane array 12 forms the brine stream that exits in the brine pipe 16.

The permeate stream 14 is a purified fluid flow at a low pressure that collects in a tank 28 or is piped to a desired location. The brine stream 16 is a higher pressure stream that contains dissolved materials blocked by the membrane 26. The pressure of the brine stream 16 is only slightly lower than the feed stream 18. A control valve 30 may be used to regulate the flow through and pressure in the membrane array 12. The brine stream 16 may flow through the control valve 30 and into a drain or tank 32.

Referring now to FIG. 1B, the membrane 26 of FIG. 1A is typically formed of a plurality of elements 40. The elements 40 are typically formed in a cylindrical shape by rolling a plurality of sheets and spacers together. In this example a first sheet 42 and a second sheet 44 are glued together on three sides with the fourth side being in glued communication with the central collection tube 46 communicates permeate to a desired location as indicated by arrow 48. Brine which may also be referred to as reject 50 does not enter the collection tube 46. The sheets and the spacers glued between the membrane sheets 42 and 44 to allow the sheet 44 to stay slightly apart and allow permeate to flow to the collection tube 46. A second spacer sheet 54 is used to keep the membrane sheets slightly apart and allow the axial flow through the element and allow brine or reject 50 to flow therethrough.

Referring now to FIG. 1C, an inlet pipe 60 fluidically communicates fluid into the pressure vessel 24. A flow distributor 62 distributes fluid to the reverse osmosis elements 40A-40E rather than around the elements 40A-40E. The fluid distributor 62 spreads the fluid flow radially across the surface of element 40A. The seal 64 allows fluid from the distributor 62 to not circumvent the first element 40A. The flow continues through the elements 40A-40E sequentially. Permeate collection tubes 46A, 46B, 46C, 46D and 46E receive permeate from each respective element 40A-40E. Connectors 66A-66D join successive collection tubes 46A-46E. An anti-telescoping device 68 may be used to maintain the position of the elements 40A-40E relative to the flow distributor 62. In most applications between three and eight elements are used. Five of which are used in this example. A brine exit pipe 70 is used to emit the brine from the pressure vessel 24. Permeate exit collection tube flows in a direction indicated by the arrow 48.

As the feed progresses from element to element, the amount of total dissolved solids increases until the brine exits the pipe 70. The osmotic pressure is mostly determined by the concentration of the total dissolved solids. Each succeeding element experiences a higher concentration and thus higher osmotic pressure and lower Net Driving Pressure than the preceding element. Consequently, each successful element has lower permeate production than the preceding element. A minimum Net Driving Pressure for sea water in an RO system is about 100 psi (689.5 kPa). An initial feed pressure must be substantially higher than the initial osmotic pressure to ensure sufficient Net Driving Pressure available toward the end of the array. A typical pressure may be about 800 psi (5516 kPa) while the osmotic pressure is about 450 psi (3103 kPa) which yields a Net Driving Pressure of 350 psi (2413 kPa) for the first element. At the end of the array the osmotic pressure may be 700 psi (4826 kPa) which reduces the Net Driving Pressure to 100 psi (689.5 kPa). A high initial Net Driving Pressure is wasteful because the pressure is much higher than needed for an optimal rate of permeate production. In an ideal situation, the feed pressure would steadily increase to compensate for the increasing osmotic pressure resulting in a constant net driving pressure throughout the array.

Another issue with reverse osmosis systems is polarization. Polarization is the formation of a stagnant boundary layer adjacent to the membrane surface where the concentration of salinity and foulant becomes very high. Polarization occurs when the flow velocity through the membrane elements is reduced to a certain value. Polarization typically becomes severe when flow velocity drops to below fifty percent relative to the inlet flow velocity of the first element. The typical amount of permeate that can be recovered is about fifty percent or lower and may have a typical range between thirty-eight and forty-five percent.

Referring now to FIG. 2A, one way in which to achieve higher permeate recovery is employing a first set of pressure vessels 210A, 210B which feed a second set of pressure vessels 210C. In this example, two pressure vessels are illustrated in a first stage 212 and a single pressure vessel is illustrated in a second stage 214. This type of configuration is referred to as a 2:1 array. Feed fluid enters a feed manifold 220 which is distributed between the pressure vessels 210A and 210B. The brine exits the pressure vessels 210A and 210B through a brine manifold 224 to pressure vessel 210C in the second stage 214. Permeate exits the pressure vessels 210A and 210B through a permeate manifold 228. The permeate manifold 228 is also in communication with the permeate generated in the pressure vessel 210C. The higher concentrated brine is removed from the pressure vessel 210C through a brine pipe 230. Of course, other types of array configurations are known such as a 3:2 and 4:3. For three-stage systems 6:4:2 configurations have been used. Two-stage systems have permeate recovery of about fifty percent to seventy-five percent. Three stage systems may also recover up to about eighty-five percent of permeate.

A second example of a two-stage system is illustrated in FIG. 2B. In this example, a boost pump 240 is used between the two stages. That is, the boost pump 240 is in communication with the brine manifold 224 and boosts the pressure in the brine manifold 224 to a desirable pressure to compensate the losses in the Net Driving Pressure that occur within the pressure vessels 210A and 210B of the first stage 212. Energy recovery devices such as turbochargers are known to be used in reverse osmosis systems to recover the hydraulic energy in a brine stream that exit the last stage and boosts the pressure of another stream such as the feed stream.

In FIG. 3A a pressure vessel 310 has a brine stream 312 that is directed to a turbocharger 314 that has a pump portion 316 and a turbine portion 318. The turbine portion 318 receives the highly pressurized brine stream 312 which in turn is used to drive the pump 316 that receives feed fluid from a high pressure pump 320. The high pressure pump 320 is driven by a motor 322. The turbine 318 may also be connected to a motor 330 through a common shaft 332. The motor 330 is driven by a variable frequency device 334. During operation, the feed fluid is pressurized to an intermediate level by the high pressure pump 320. The final pressure of the feed fluid is attained by the pump portion 316 of the turbocharger 314. The pump portion 316 provides the feed fluid to the pressure vessel 310 through a feed pipe 340. Permeate leaves the pressure vessel through the permeate pipe 342.

A variable frequency drive 324 is used to drive the pump 320. However, if a motor 330 and variable frequency drive 334 are provided at the turbine 318, the variable frequency drive 324 is not necessary. Tin some cases, motor 330 may act as a generator should the turbine portion 318 produce more power than needed by pump portion 316 to generate the desired feed boost. Fluid that has been depressurized in the turbine portion 318 is received within a drain 349.

A reverse osmosis system having a first stage 350 and a second stage 352 is illustrated by FIG. 3B. The first stage 350 is illustrated having a first pressure vessel 353 while the second stage is illustrated having a second pressure vessel 354. The permeate from each stage 350, 352 is collected in a permeate manifold 356. A brine manifold 358 is in communication with a turbocharger 360 that has a pump portion 362 and a turbine portion 364. A turbine portion 364 receives the pressurized brine fluid from the brine manifold 358 and turns the pump portion 362 to pressurize the brine fluid within the brine manifold 366 exiting from the first pressure vessel 353. A motor 370 and variable frequency drive 372 may also be used in this configuration. The motor 370 is used to adjust the motor speed of the turbine portion 364 which in turn raises the speed and pressure output of the pump portion 362. Thus, the motor 370 may be used to increase or reduce the boost from the pump portion 362.

Referring now to FIG. 4A, a turbocharger 410 is illustrated having a pump portion 412 and a turbine portion 414. The turbine includes a main nozzle 416 and an auxiliary nozzle 418 which is controlled by an auxiliary valve 420. A bypass valve 422 is located outside of the turbocharger 410 and may be used to control the amount of fluid bypassing the turbine portion 414. The entire or nearly the entire amount of fluid directed toward the turbocharger 410 may be communicated to the bypass valve 422. A backpressure valve 424 is in fluid communication with the outlet of the turbine portion 414 and or the valve 422. The backpressure valve 424 is used to create a backpressure on the turbine portion 414. The flow through the pipe 430 is regulated by the bypass valve 422. The controller 426 controls the operation of the auxiliary valve 420 through control line 432A. The operation of the bypass valve through control line 432B and the control of the back pressure valve 424 through control line 432C. Typically, a system operator changes the settings to open and enclose the valves in the desired manner.

Referring now to FIG. 4B, the turbine differential versus turbine flow 450 has the auxiliary valve 420 in a closed position. Line 452 illustrates the differential pressure with the auxiliary valve open over a turbine flow range. Curve 454 shows the estimated feed pressure boost with the auxiliary nozzle in the fully opened position. Curve 456 shows the feed boost with the auxiliary nozzle fully closed. The graph illustrates 460, 462, 464 and 466. Area 460 is entirely within the auxiliary nozzle range and has the bypass valve 422 fully closed and the backpressure valve 424 fully opened. Area 462 extends into the region which the turbine cannot create enough flow resistance to achieve the desired $\Delta P$ at the indicated flow range. Therefore backpressure valve 424 must be partially closed. Area 464 extends into the bypass region that illustrates that the turbine cannot bypass the entire flow. Therefore, the bypass valve 422 and turbine is needed to handle the excess flow. In area 466 a portion is in the backpressure and a portion in the bypass region. Therefore, bypass valve 422 and the backpressure valve 424 are actuated appropriately. That is, the areas 462, 464, 466 are manipulated by the valves 422 and 424 so that the turbine operates between the curves 450 and 452.

Referring now to FIG. 5A, an energy recovery device 510 is illustrated having with a main inlet nozzle 512 that receives a brine stream. The inlet nozzle 512 communicates inlet fluid such as the brine stream to a volute 514. An auxiliary channel 520 is used to communicate fluid through an auxiliary nozzle 522. A valve stem 524 is manually operated to open and close the auxiliary nozzle 522. A seal 526 such as an O-ring or O-rings prevent leaking of brine toward the handle 528 and adjacent to the valve stem 524 from being communicated to the atmosphere. The valve stem 524 in FIG. 5A is shown in a closed position. According to FIG. 5B, the valve stem 524 is illustrated in an open position to show the valve seat 530 against which the end of the valve stem 524 seals. When additional turbine flow or a reduced differential pressure is required across the turbine the valve stem 524 may be withdrawn to create a flow path from the turbine inlet to the volute through the passage or auxiliary nozzle 522.

SUMMARY

In one aspect of the disclosure, a turbocharger includes a turbocharger housing having an impeller housing comprising a circular cross-section. A main nozzle is disposed within the turbocharger housing communicating a first portion of a fluid stream to a first volute. A first auxiliary channel and a first auxiliary nozzle communicating a second portion of the fluid stream to the first volute. The first auxiliary nozzle is downstream of the main nozzle. A second auxiliary channel and a second auxiliary nozzle communicate a third portion of the fluid stream to the first volute. The second auxiliary nozzle is downstream of the first auxiliary nozzle. A valve assembly is selectively coupling the first auxiliary channel to the first auxiliary nozzle and the second auxiliary channel to the second auxiliary nozzle.

In another aspect of the disclosure, reverse osmosis system comprises a first membrane array configured to receive a feed stream and to generate a first permeate stream and a first brine stream from the feed stream. A second membrane array is configured to receive the first brine stream and to generate a second permeate stream and a second brine stream from the first brine stream. A turbocharger has a turbocharger housing having an impeller housing comprising a circular cross-section. A main nozzle is disposed within the turbocharger housing communicating a first portion of a fluid stream to a first volute. A first auxiliary channel and a first auxiliary nozzle communicate a second portion of the fluid stream to the first volute. The first auxiliary nozzle is downstream of the main nozzle. A second auxiliary channel and a second auxiliary nozzle communicates a third portion of the fluid stream to the first volute. The second auxiliary nozzle is downstream of the first auxiliary nozzle. A valve assembly selectively couples the first auxiliary channel to the first auxiliary nozzle and the second auxiliary channel to the second auxiliary nozzle. A first flowmeter generates a first flow signal corresponding to a first flow of the first permeate stream. A second flowmeter generates a second flow signal corresponding to a second flow of the second permeate stream. A third flowmeter generates a third flow signal corresponding to a third flow of the second brine stream. A controller is in communication with the first flowmeter, the second flowmeter and the third flowmeter. The controller controls the valve assembly in response to the first flow signal, the second flow signal and the third flow signal.

In another aspect of the disclosure, a method of operating a reverse osmosis system includes directing a feed stream to a first membrane array to separate the feed stream into a first permeate stream and a first brine stream; directing the first brine stream to a second membrane array to separate the first brine stream into a second permeate stream and a second brine stream; determining a first flow signal corresponding to a first flow in the first permeate stream; determining a second flow signal corresponding to a second flow in the second permeate stream; determining a third flow signal corresponding to a third flow in the second brine stream; determining a first auxiliary nozzle valve setting of a first turbocharger and a second auxiliary nozzle valve setting of the first turbocharger in response to the first flow signal and the third flow signal; determining a third auxiliary nozzle valve setting of a second turbocharger and a fourth auxiliary nozzle valve setting of the second turbocharger in response to the second flow signal and the third flow signal; and, controlling a torque output of a motor-generator coupled to a first hydraulic pressure booster to adjust an amount by which a first hydraulic booster increases a pressure of at least one of the feed stream and the first brine stream in response to the first flow signal. A pump is operable to pressurize a feed stream. A first membrane array is configured to receive the feed stream and generates a first permeate stream and a first brine stream from the feed stream. A second membrane array is configured to receive the first brine stream and to generate a second permeate stream and a second brine stream from the first brine stream. A first turbocharger comprises a first turbine configured to receive the second brine stream and to use first energy from the second brine stream to selectively increase a first pressure of the first brine stream. The first turbine comprising a first turbocharger housing comprising a first main nozzle disposed within the turbocharger housing communicating a first portion of the second brine stream to a first volute, a first auxiliary channel and a first auxiliary nozzle communicating a second portion of the second brine stream to the first volute. The first auxiliary nozzle is downstream of the first main nozzle, a second auxiliary channel and a second auxiliary nozzle communicating a third portion of the second brine stream to the first volute, the second auxiliary nozzle downstream of the first auxiliary nozzle. The first valve assembly selectively couples the first auxiliary channel to the first auxiliary nozzle and the second auxiliary channel to the second auxiliary nozzle. The first portion, the second portion and third portion combine to reform the second brine stream in the first volute. A second turbocharger comprises a second turbine configured to receive the second brine stream after the first turbocharger and to use second energy from the second brine stream to increase a second pressure of the feed stream, the second turbine comprising a second turbocharger housing comprising a second main nozzle disposed within the second turbocharger housing communicating a fourth portion of the second brine stream to a second volute. A third auxiliary channel and a third auxiliary nozzle communicates a fifth portion of the second brine stream to the second volute. The third auxiliary nozzle is downstream of the second main nozzle. A fourth auxiliary channel and a fourth auxiliary nozzle communicates a sixth portion of the second brine stream to the second volute. The fourth auxiliary nozzle is downstream of the third auxiliary nozzle. A second valve assembly selectively couples the third auxiliary channel to the third auxiliary nozzle and the fourth auxiliary channel to the fourth auxiliary nozzle. A first flowmeter generates a first flow signal corresponding to a first flow of the first permeate stream. A second flowmeter generates a second flow signal corresponding to a second flow of the second permeate stream. A third flowmeter generates a third flow signal corresponding to a third flow of the second brine stream. A motor is coupled to the first turbocharger and is operable to use energy from a power supply to drive the first turbocharger. A controller is in communication with the first flowmeter, the second flowmeter and the third flowmeter, said controller controlling the first valve assembly and the second valve assembly in response to the first flow signal, the second flow signal and the third flow signal.

In yet another aspect of the disclosure, a method of operating a turbocharger is set forth. The turbocharger includes a main nozzle comprising a first effective area, a first auxiliary nozzle comprising a second effective area, a second auxiliary nozzle comprising a third effective area and a third auxiliary nozzle comprising a fourth effective area, said first effective area of the main nozzle is greater than a second effective area, the second effective area is greater than a third effective area and the third effective area is greater the fourth effective area. The method includes communicating fluid from a turbocharger inlet to a volute through the main nozzle; when more fluid to the volute is needed, opening the third auxiliary nozzle so that the fluid is communicated to the volute through the main nozzle and the third auxiliary nozzle; when more fluid to the volute is needed after opening the third nozzle, closing the third auxiliary nozzle and opening the second auxiliary nozzle so that the fluid is communicated from the main nozzle and the second auxiliary nozzle; when more fluid to the volute is needed after closing the third auxiliary nozzle and opening the second auxiliary nozzle, closing the second auxiliary nozzle and opening the first auxiliary nozzle so that the fluid is communicated to the volute through the main nozzle an the first auxiliary nozzle; when more fluid to the volute is needed after closing the second auxiliary nozzle and opening the first auxiliary nozzle, opening the third auxiliary nozzle so that the fluid is communicated to the volute through the main nozzle, the first auxiliary nozzle and the third auxiliary nozzle; thereafter, when more fluid to the volute is needed after opening the third auxiliary nozzle, closing the third nozzle and opening the second nozzle so that the fluid is communicated to the volute through the main nozzle, the first auxiliary nozzle and the second auxiliary nozzle; and, thereafter, when more fluid to the volute is needed after closing the third nozzle and opening the second nozzle, opening the third nozzle so that fluid is communicated to the volute from the main nozzle, the first auxiliary nozzle, the second auxiliary nozzle and the third auxiliary nozzle.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

FIG. 9A is a block diagrammatic view of a reverse osmosis system having multiple stages according to the present disclosure.

FIG. 9B is a chart illustrating the operation of the interstage turbo 940 of FIG. 9A.

FIG. 9C is a chart illustrating the configuration of the auxiliary valve and bypass valve for the feed turbo 922 of FIG. 9A.

FIG. 12A is a block diagrammatic view of a second example of a reverse osmosis system having multiple stages according to the present disclosure.

FIG. 12B is a chart illustrating the operation of the system of FIG. 12A.

FIG. 13A is a block diagrammatic view of a third example of a reverse osmosis system having multiple stages according to the present disclosure.

FIG. 13B is a chart illustrating the operation of the system of FIG. 13A.

FIG. 15B is a chart illustrating the operation of the system of FIG. 15.

DETAILED DESCRIPTION

Figure 1A:
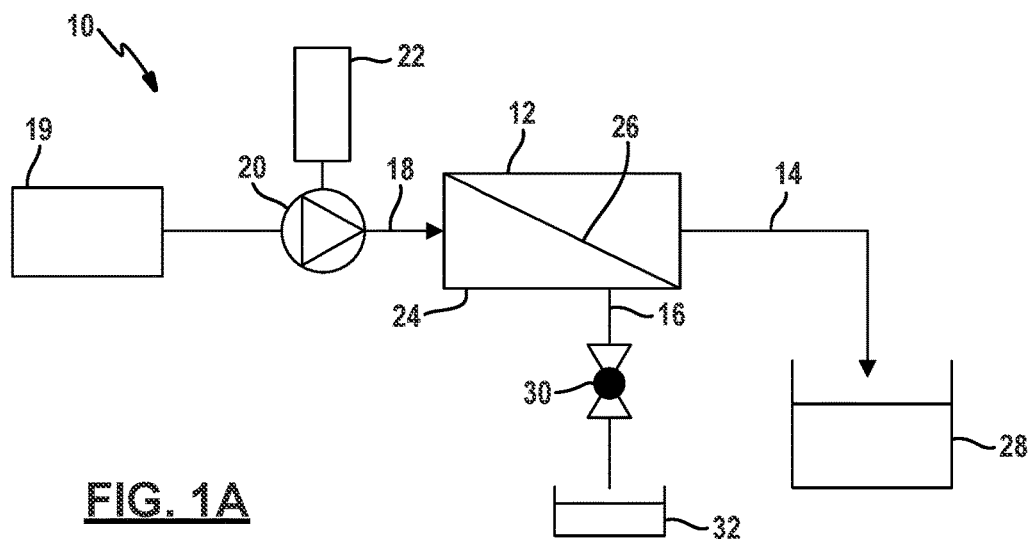
FIG. 1A is a schematic view of a prior art reverse osmosis system.
Figure 1B:
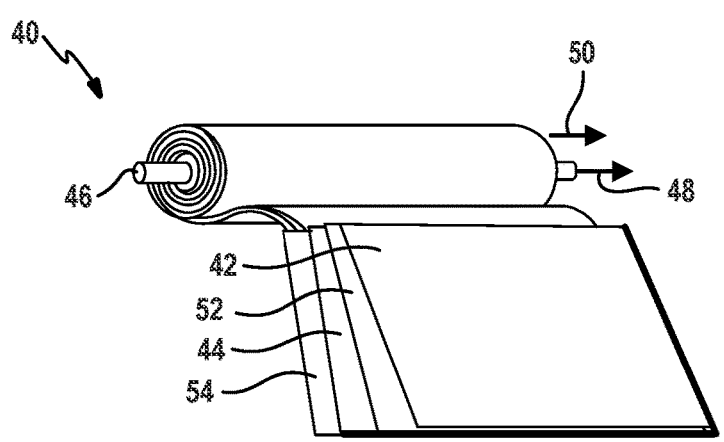
FIG. 1B is a perspective view of a permeate membrane showing the layers therein of the prior art.
Figure 1C:
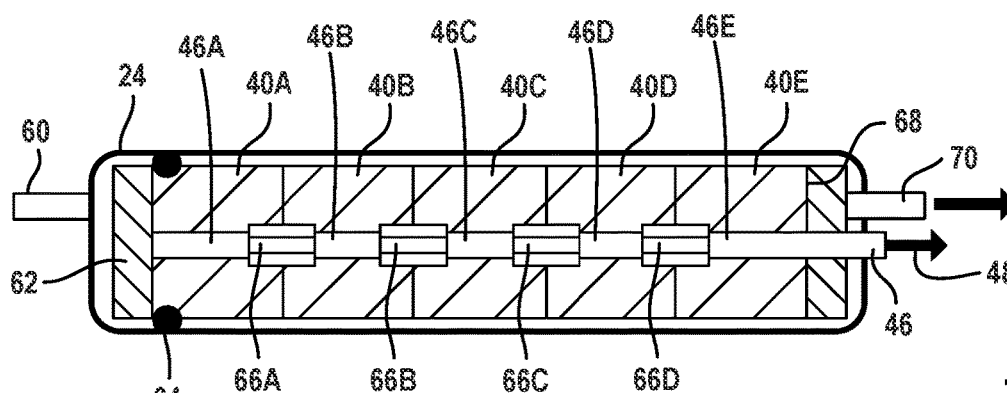
FIG. 1C is a cutaway view of a pressure vessel having a plurality of membrane elements of the prior art.
Figure 2A:
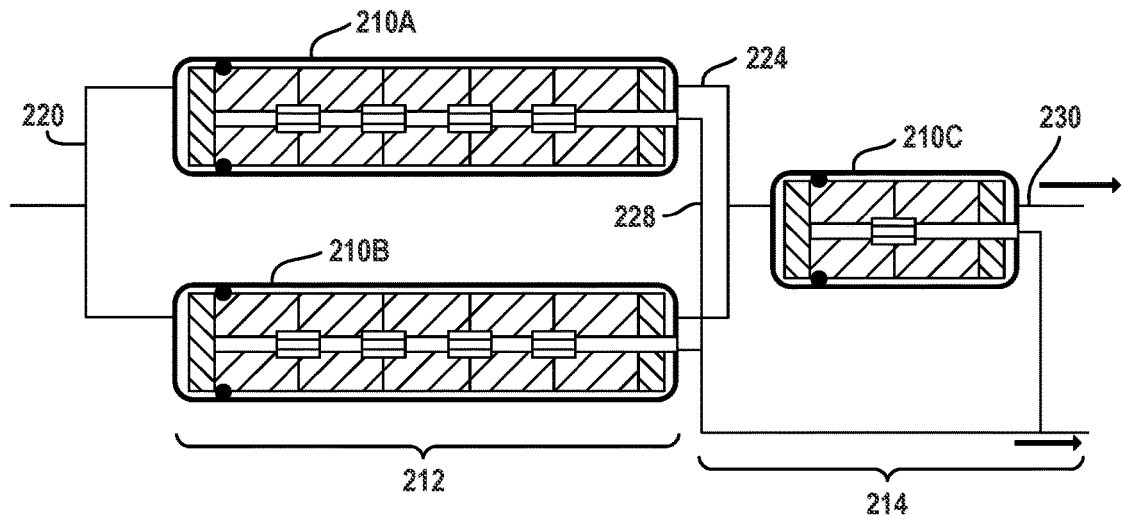
FIG. 2A is a block diagrammatic view of a multistage multi-element pressure vessel configuration of the prior art.
Figure 2B:
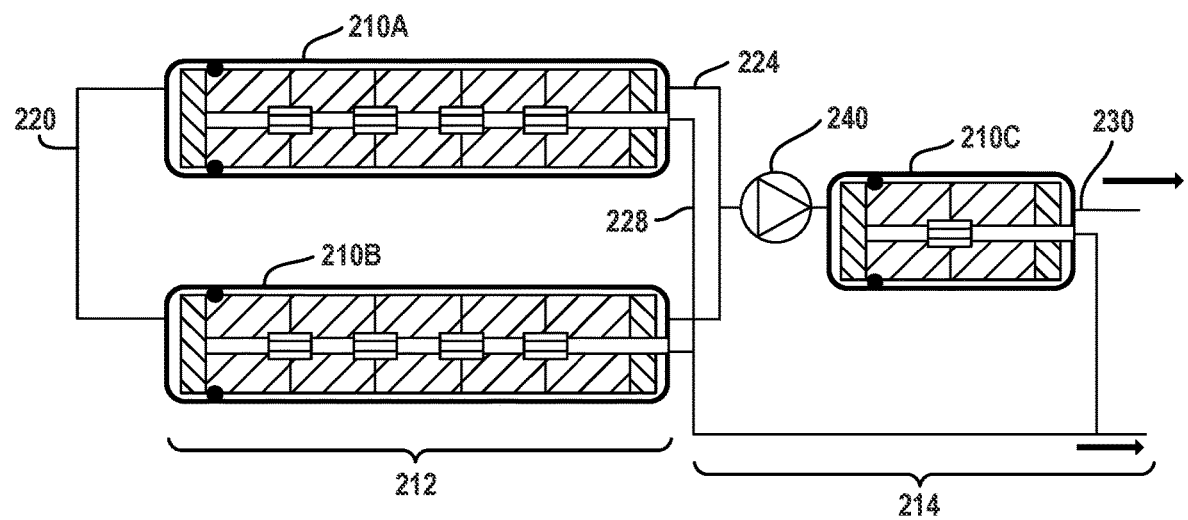
FIG. 2B is a schematic view of a multi-element pressure vessel according to the prior art.
Figure 3A:
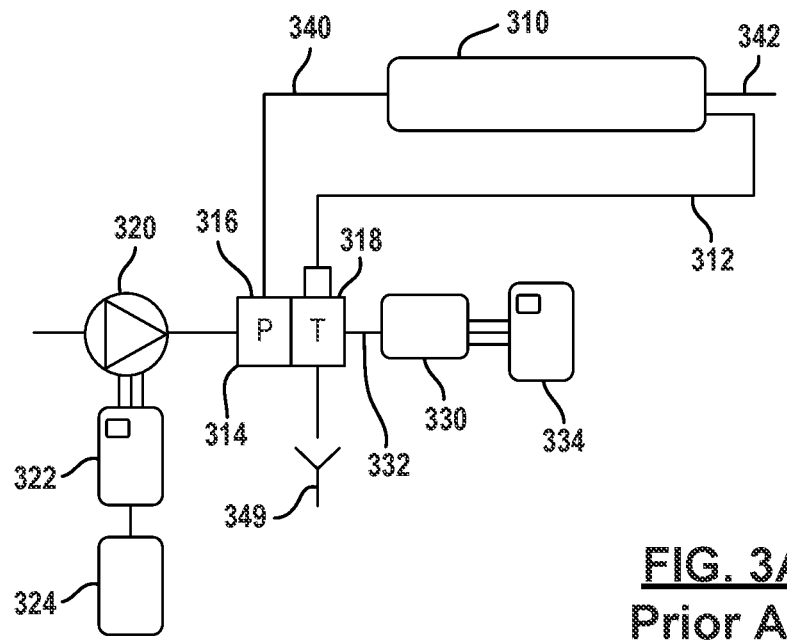
FIG. 3A is a schematic view of a reverse osmosis system with a motor coupled to a turbocharger of the prior art.
Figure 3B:
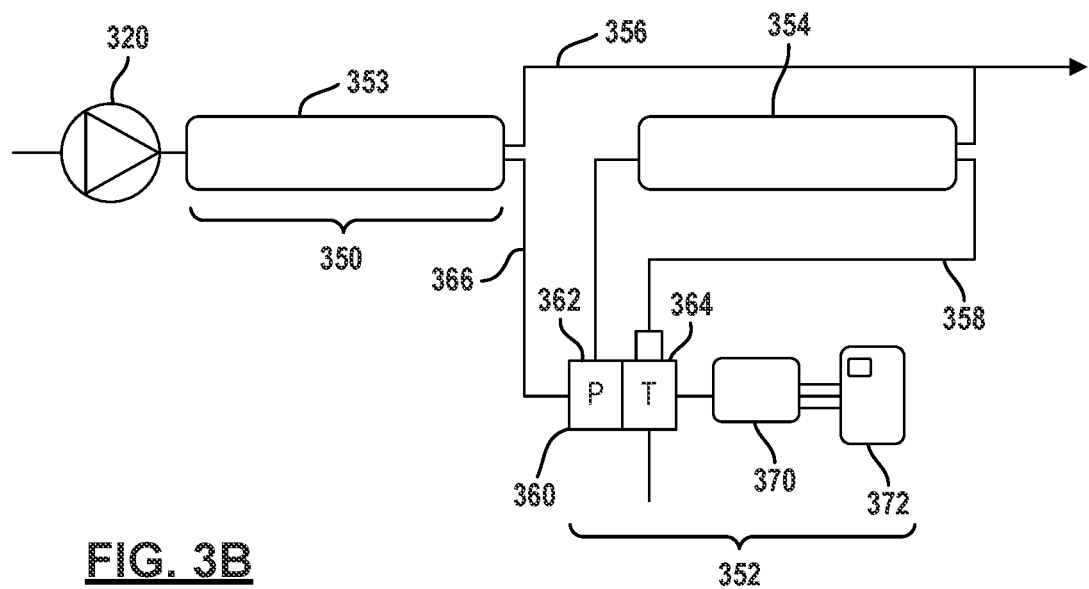
FIG. 3B is a schematic view of a reverse osmosis system according to the prior art.
Figure 4A:
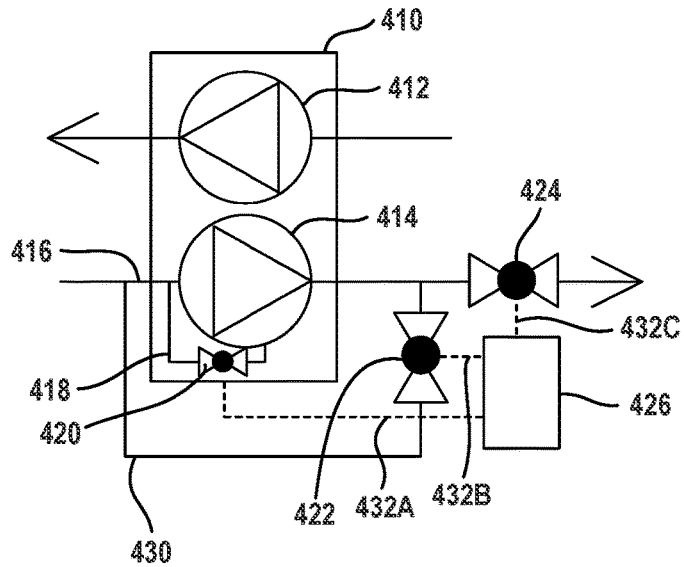
FIG. 4A is a schematic view of a turbocharger having a bypass valve and an auxiliary valve according to the prior art.
Figure 4B:
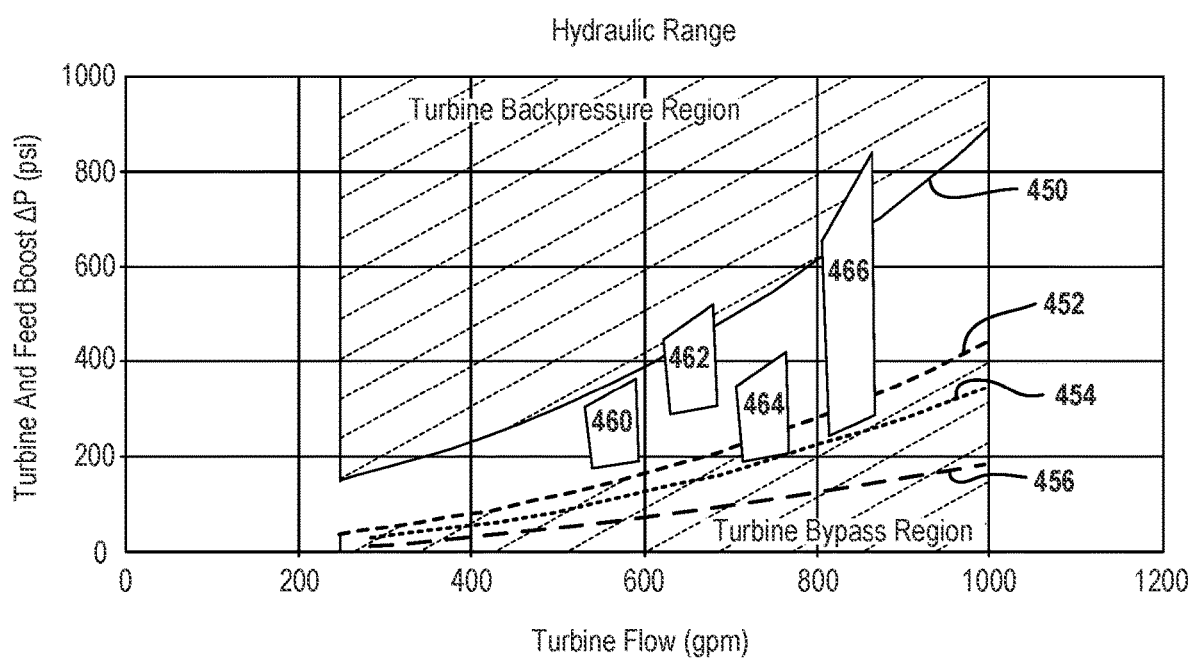
FIG. 4B is a plot of a method for operating a reverse osmosis system showing a turbine and feed boost differential and turbine flow.
Figure 5A:
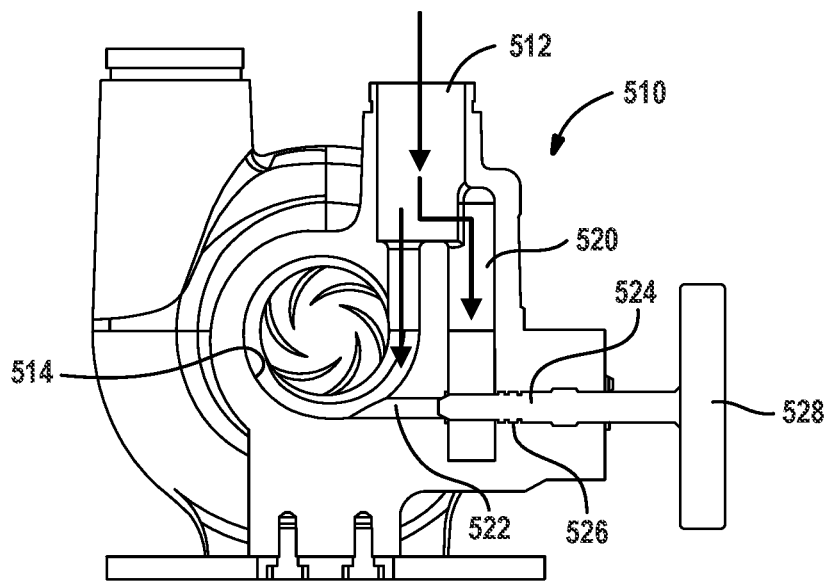
FIG. 5A is a cutaway view of a turbocharger having an auxiliary nozzle of the prior art.
Figure 5B:
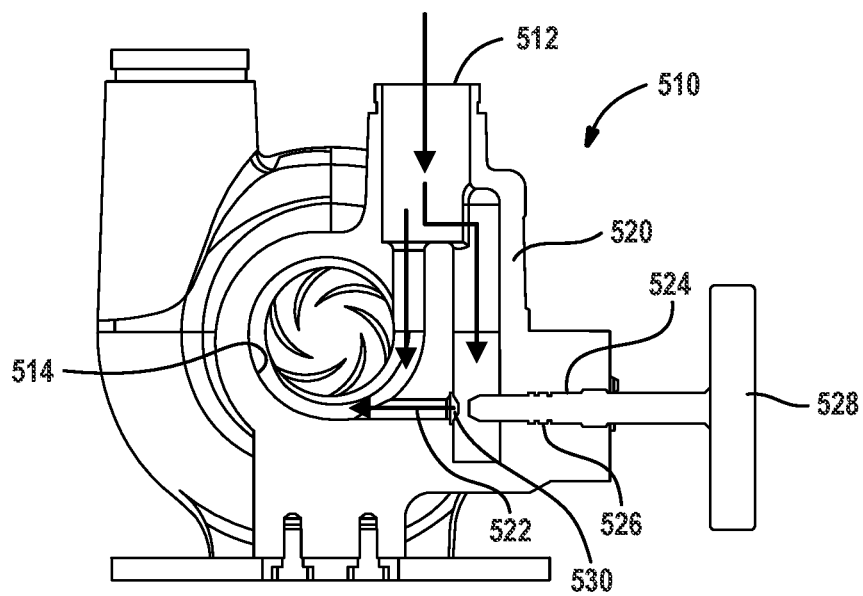
FIG. 5B is a cutaway view of the turbine illustrated in FIG. 5A in an open position of the prior art.

The following description is merely exemplary in nature and is not intended to limit the present disclosure, application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

Referring now to FIG. 6, a reverse osmosis system 610 is having a first stage 612 and a second stage 614. The first stage 612 includes three pressure vessels 620A, 620B and 620C that are disposed in parallel. The second stage 614 includes 620D and 620E. Various numbers of pressure vessels may be located in each of the stages 612, 614. Further, various numbers of stages may be included in the system. Flow is reduced as the fluid progresses through the stages so subsequent stages have fewer pressure vessels than the previous stages.

A high pressure pump 630 receives sea or brackish water. The high pressure pump 630 supplies an energy recovery device such as a hydraulic turbocharger 632 with highly pressurized fluid. The turbocharger 632 as will be further described below increases the pressure of the fluid provided from the high pressure pump system 630. The turbocharger 632 includes a pump portion 634 and a turbine portion 636. The turbocharger 632 may be in communication with a motor 637 that rotates a common shaft 639 that extends to and rotates the pump portion 634 and the turbine portion 636. The pump portion 634 is in fluid communication with a feed manifold 638 which provides the pressurized fluid to the pressure vessel 620A-620C in parallel. The pressure vessels 620A-620C produce permeate which is directed to a permeate manifold 640. The brine from the pressure vessels 620A-620C are provided to a second turbocharger 642 which includes a pump portion 644 and a turbine portion 646 through a brine manifold 648. The pump portion 644 receives highly pressurized brine fluid from the pressure vessel 620A-620C. The pump portion 644 increases the pressure of the fluid within the brine manifold 648. Thus, the fluid pressure in an inlet manifold 650 to the second stage 614 of pressure vessels 620D-620E is increased. Permeate produced at the pressure vessels 620D and 620E are in communication with the permeate manifold 640. The brine from the pressure vessels 620D and 620E is in communication with brine manifold 654 which is in communication with the turbine portion 646 of the turbocharger 642. The pressurized fluid in the brine manifold 654 drives the turbine portion 644 which in turn drives the pump portion 644.

The turbine portion 646 has an outlet 656 that communicates the entire volume of brine from the turbine portion 646 to the inlet of the turbine portion 636. The outlet of the turbine portion 636 is communicated fluidically to a drain 658.

Figure 6A:
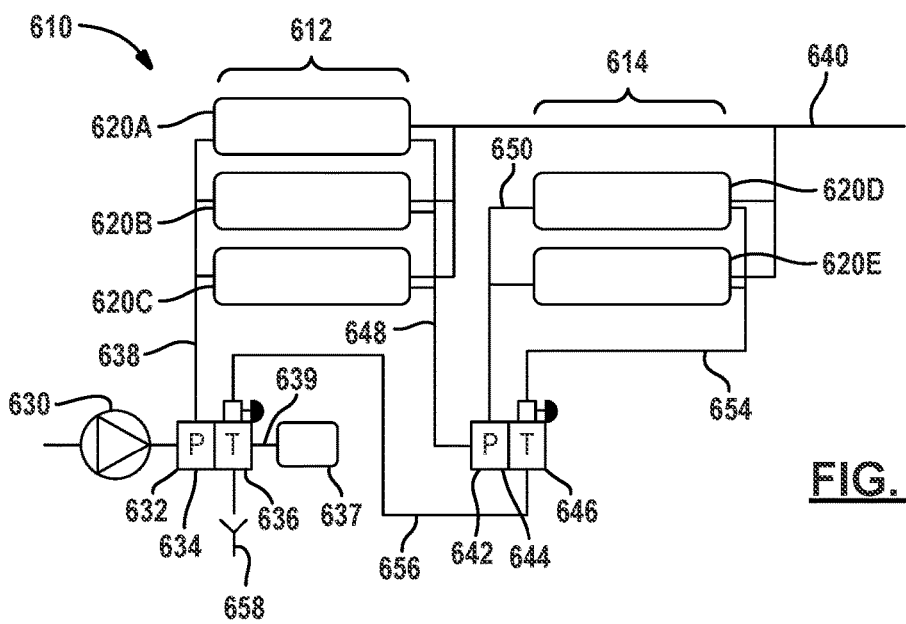
FIG. 6A is a schematic view of a multistage reverse osmosis system according to the above disclosure.
Figure 6B:
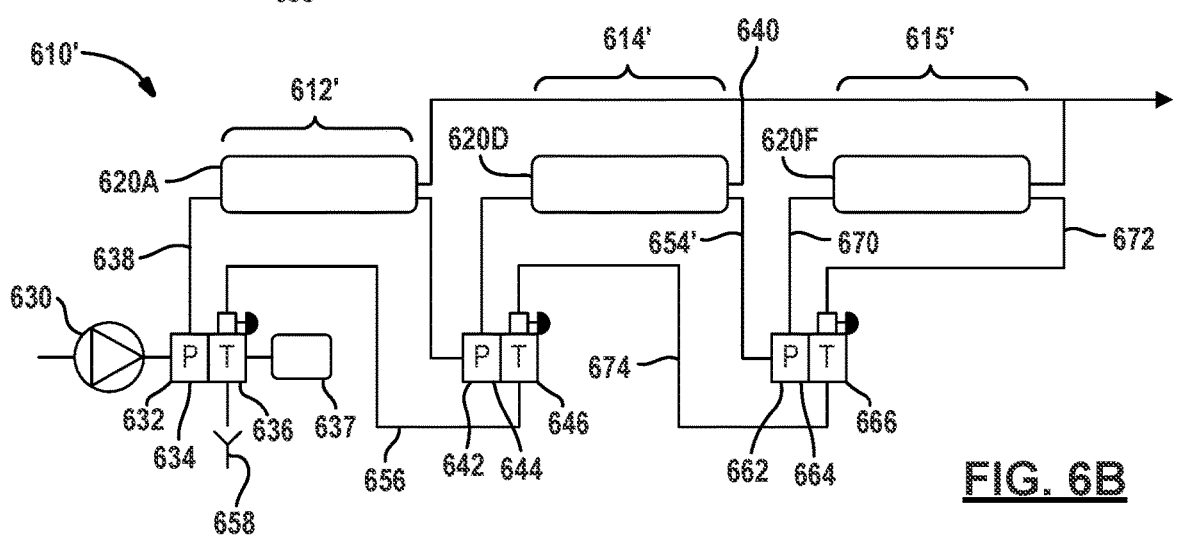
FIG. 6B is a schematic view of a multistage reverse osmosis system.

Referring now to FIG. 6B, a three stage multi-stage reverse osmosis system 10' is illustrated. In this example, three stages 612', 614' and 615' are illustrated. Although only one pressure vessel 620A, 620D and 620F are illustrated in each stage, the pressure vessels 620A-620F may represent multiple pressure vessels in parallel. Following the example set forth in FIG. 6A, the first stage may have a greater number of pressure vessels than stage 614' and stage 614' may have a greater number of pressure vessels than the stage 615'.

Because of the additional stage, an additional turbocharger 662 having a pump portion 664 and a turbine portion 666 is set forth. In this example, the brine pump manifold 654' is in communication with the third turbocharger 662. The outlet of each of the three pressure vessels illustrated (or the parallel combination of pressure vessels) is in fluid communication with permeate manifold 640. In this example, the pump portion 664 communicates fluid to an inlet pipe 670 of the pressure vessel 620F. The brine outlet 672 of the pressure vessel 620F is fluid communication with the turbine portion 666. All of the fluid leaving the turbine portion is communicated to the turbine portion 646 through pipe 674. This includes the bypassed fluid and the fluid from within the volute. All of the fluid leaving the turbine portion 646 is in communication with the turbine portion 636.

Figure 6C:
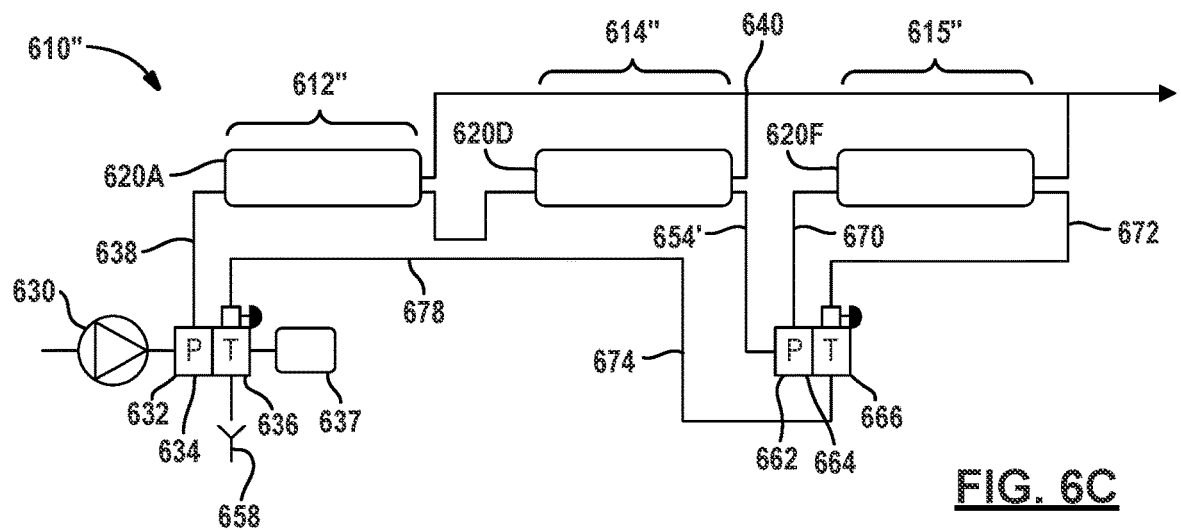
FIG. 6C is a schematic view of a multistage reverse osmosis system according to a third example of the present disclosure.

Referring now to FIG. 6C, a three stage reverse osmosis system 610" is set forth. In this example, the three stages 612", 614" and 615" may also include a plurality of pressure tanks in parallel. Similar elements are illustrated from that of FIG. 6B. In this example, the second stage turbocharger 642 has been removed. In this example, a pipe 678 is used to communicate the turbine portion 666 with the turbine portion 636 directly. All of the brine fluid communicated through the turbine portion 666 is communicated to the turbine portion 636.

Referring now to FIGS. 7A-7J, the turbochargers illustrated in FIGS. 6A-6B may be formed according to the following configurations for a turbocharger illustrated below. Specifically referring to FIGS. 7A-7C, the turbocharger 710 includes a turbocharger housing 712. The turbocharger housing 712 includes a volute 714 that has a rotating impeller 715 therein. The details of impeller 715 has been left off for simplicity purposes. The turbocharger 710 includes an inlet 716 that leads to the volute 714 through a main nozzle 717. A bypass passage 718 is used for bypassing the volute 714. The bypass passage 718 is in fluid communication with the inlet 716 and an outlet 719. An auxiliary nozzle 720 is in fluid communication with an auxiliary channel 722. The auxiliary channel 722 fluidically couples the auxiliary nozzle 720 and the inlet 716. A valve stem 730 of a valve assembly is located within a valve stem channel 732. In this example, the valve stem forms two valves. In the example in FIG. 8 two valve stems forms two valves that may be independently controlled. The stem channel 732 is fluidically isolated from the auxiliary channel 722 and the bypass passage 718 by a pair of seals 736 and 738. The seal 736 is located between the auxiliary channel 722 and the bypass passage 718. The seal 738 is located between the bypass passage 718 and the exterior of the housing 712.

Figure 7A:
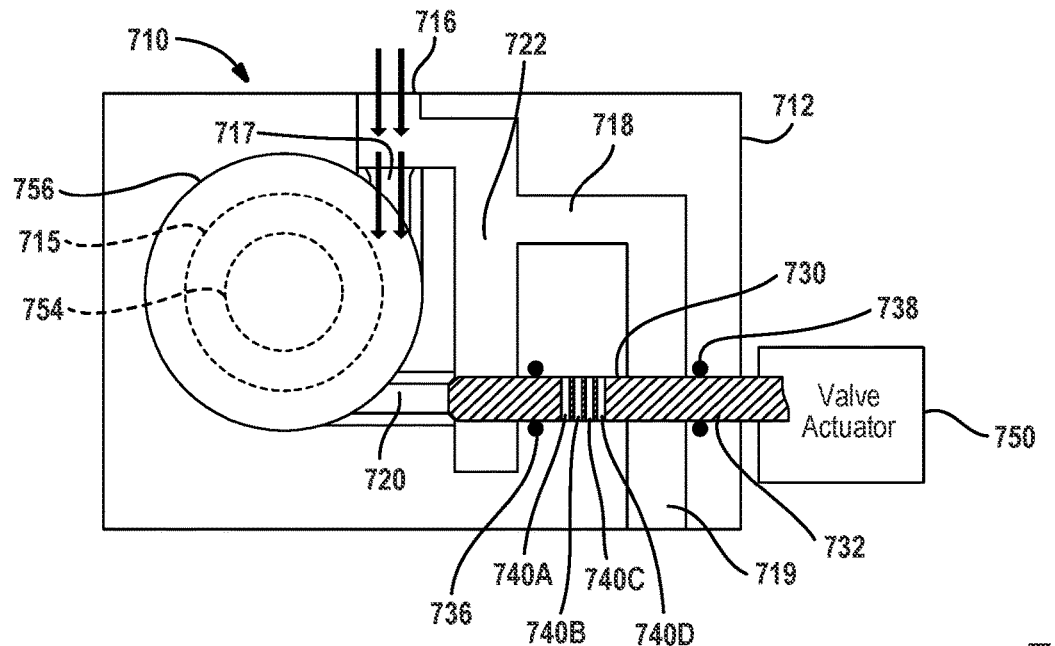
FIG. 7A is a cross-sectional view of a turbocharger bypass channel and auxiliary channel having a valve stem in a closed position.
Figure 7B:
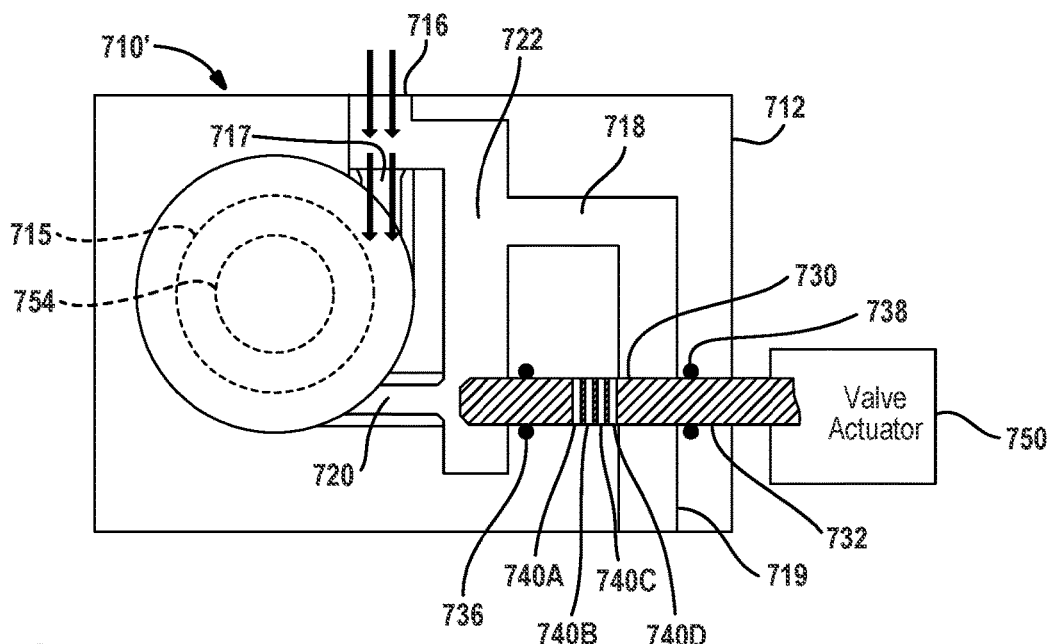
FIG. 7B is a cross-sectional view of the turbocharger of FIG. 7A having the valve stem in a partially opened position.

In FIG. 7A, the valve stem 730 is located in a closed position in that the bypass passage 718 and the auxiliary channel 722 are not communicating fluid therethrough. All of the brine flow from the inlet 716 reaches the volute 714 through main nozzle 717. In FIG. 7B, the valve stem 730 is partially withdrawn to allow flow into the auxiliary nozzle 720. Brine flow is not communicated through the bypass passage 718. By positioning the valve stem 730 in the location illustrated in FIG. 7B, additional turbine flow or reduced pressure differential across the turbine is achieved. No flow exits through the outlet 719.

Figure 7C:
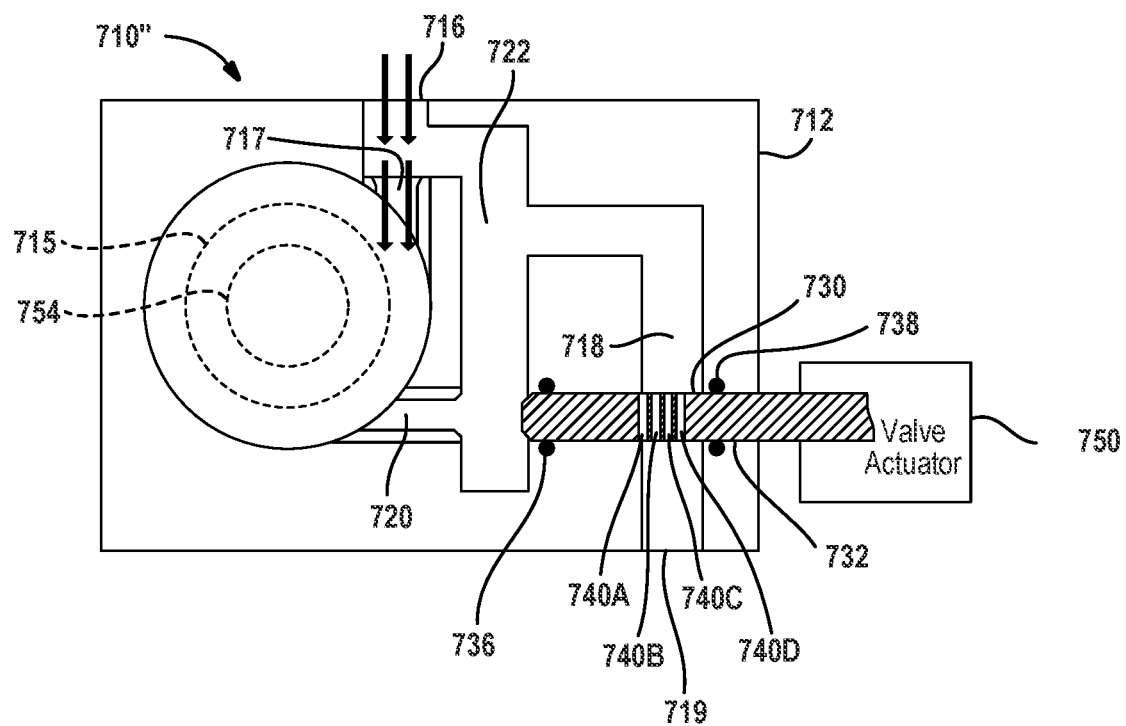
FIG. 7C is a cross-sectional view of the turbocharger of FIGS. 7A and 7B in a fully opened position.

The valve stem 730 includes a plurality of ports 740A, 740B, 740C and 740D. The ports 740A-D may be within the bypass passage 718 in which they are present during some of the positions of the valve stem 730. In FIG. 7A the ports 740 are not passing fluid therethrough and are between the bypass passage 718 and the auxiliary channel 722. In FIG. 7B, the ports 740A-740D are also not communicating fluid therethrough. In FIG. 7C the ports 740A-740D are all communicating a portion of the bypass fluid therethrough so that the bypass passage 718 has flow of fluid therethrough. The size and number of the ports 740A-740D may vary depending upon the desired flow characteristics through the bypass passage 718. Of course, a partial position is possible whereby fewer than all of the ports 740A-740D are exposed to and communicate fluid through the bypass passage 718 toward the outlet 719. Again, the number of ports and the number of exposed ports may vary depending upon the various operating conditions of the valve stem 730. It should be noted that the valve stem 730 is perpendicular to a portion of the bypass passage 718 and the auxiliary channel 722 to which it is inserted. The valve stem 730 is coaxial with the auxiliary nozzle 720. The valve stem 730 allows simultaneous control of both the bypass passage 718 and the auxiliary nozzle 720 through the auxiliary channel 722. A single valve actuator 750 may be used to move the valve. The valve actuator may be hydraulic or electrical or manual.

Figure 7D:
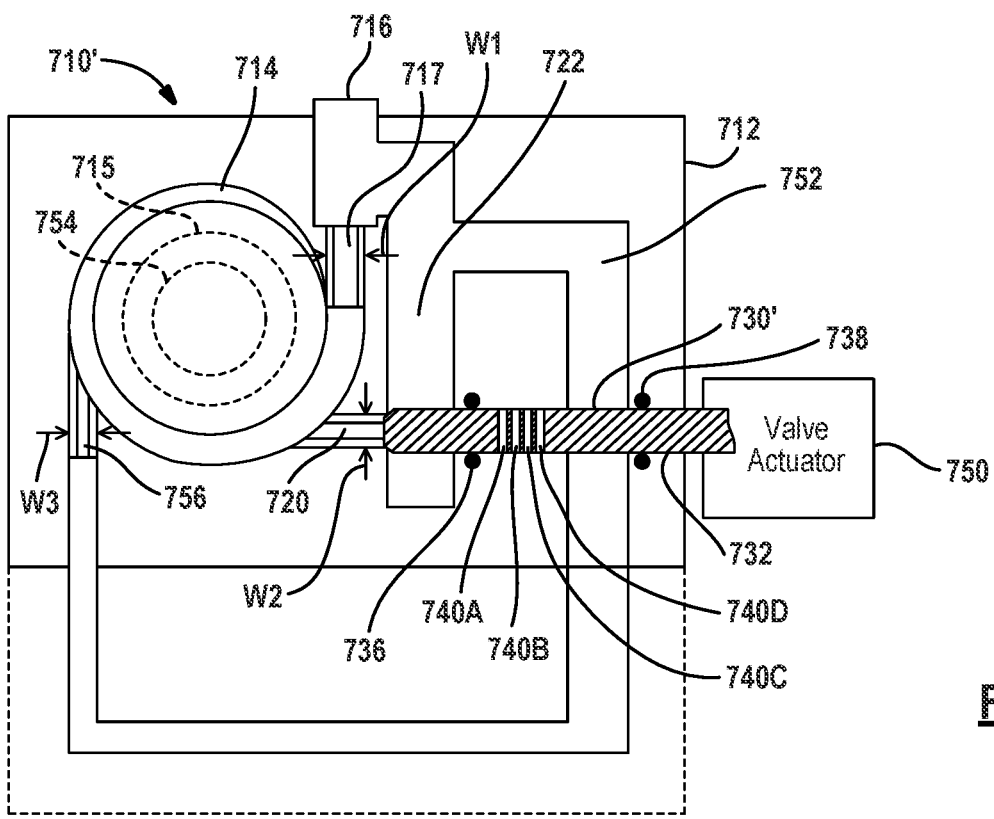
FIG. 7D is a cross-sectional view of a turbocharger having two auxiliary channels and nozzles in a first position with the valve stem completely closed.

Referring now to FIGS. 7D,-F the turbochargers illustrated in FIGS. 6A-6B may also be formed according to the following configurations for a turbocharger 710' illustrated below. Details common with FIGS. 7A-C are not repeated. As above, the turbocharger 710' includes an inlet 716 that leads to the volute 714 through a main nozzle 717. However, the bypass passage 718 is replaced with a second auxiliary channel 752 that is also in fluid communication with the inlet 716. The separate outlet 719 from above is no longer needed since all of the fluid from the inlet 716 (the second brine stream in this example) leaves the volute 714 in a conventional manner through the turbine outlet 754 which is axially disposed in this example. The turbine outlet 754 may be coupled to one of the pipes 667, 674, 656. With reference to FIGS. 6A-C, all of the fluid entering the inlet 716 is eventually rejoined in the volute. The turbine outlet 754 may also be used in FIGS. 7A-C.

The first auxiliary nozzle 720 is in fluid communication with the first auxiliary channel 722. The first auxiliary channel 722 fluidically couples the first auxiliary nozzle 720 and the inlet 716. The second auxiliary nozzle 756 is in fluid communication with the second auxiliary channel 752. The second auxiliary channel 752 fluidically couples the second auxiliary nozzle 756 and the inlet 716. The valve stem 730' is located within a stem channel 732. In this example, the valve stem 730' forms two valves, one for each auxiliary channel 722, 752. Thus, each valve stem of the valve assembly is simultaneously controlled. In the example in FIGS. 8A and 8B, two valve stems form two valves that may be independently controlled. The valve stem channel 732 is fluidically isolated from the first auxiliary channel 722 and the second auxiliary channel 752 by the pair of seals 736 and 738. The seal 736 is located between the first auxiliary channel 722 and the second auxiliary channel 752. The seal 738 is located between the second auxiliary channel 752 and the exterior of the housing 712.

Figure 7E:
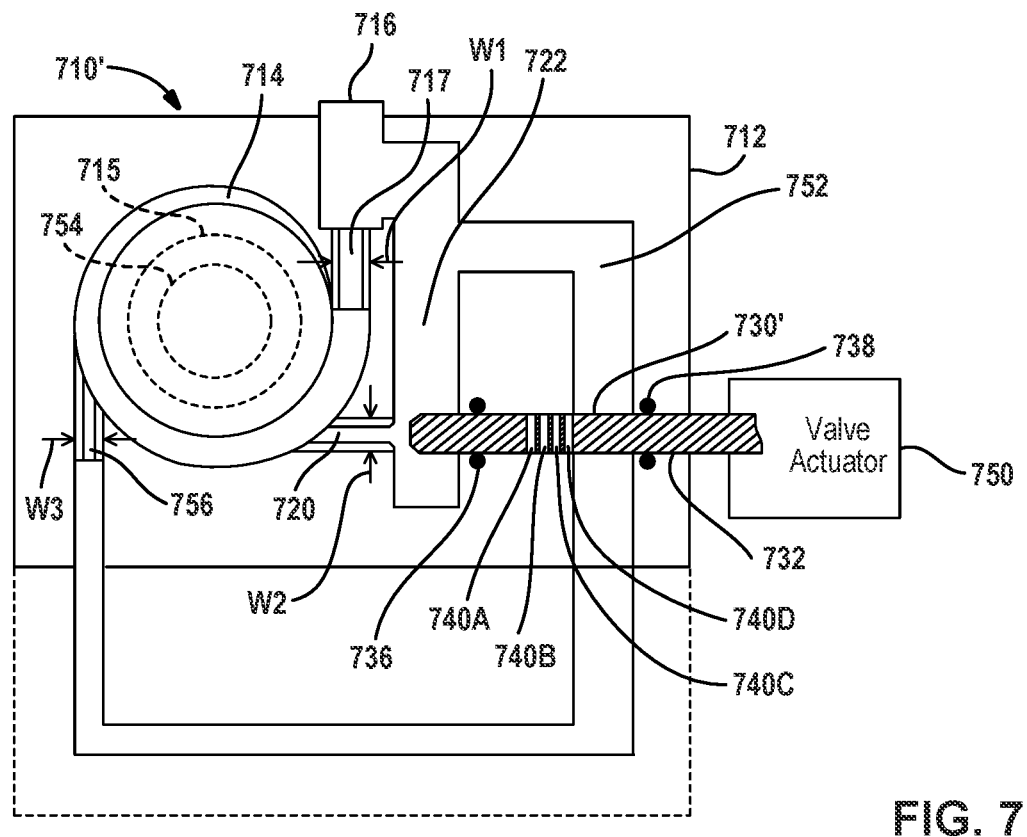
FIG. 7E is a cross-sectional view of a turbocharger having two auxiliary channels and nozzles in a second position with the valve stem partially open.

In FIG. 7D, the valve stem 730' is located in a closed position. All of the fluid flow from the inlet 716 reaches the volute 714 through main nozzle 717. If the turbocharger is used in FIGS. 6A-C, the fluid is the second brine stream. In FIG. 7E, the valve stem 730' is partially withdrawn to allow flow into the first auxiliary nozzle 720. Brine flow is not communicated through the second axillary passage 752. By positioning the valve stem 730' in the location illustrated in FIG. 7E, additional turbine flow to the volute of the turbine is achieved. That is, no flow is communicated to a second auxiliary nozzle 756.

Figure 7F:
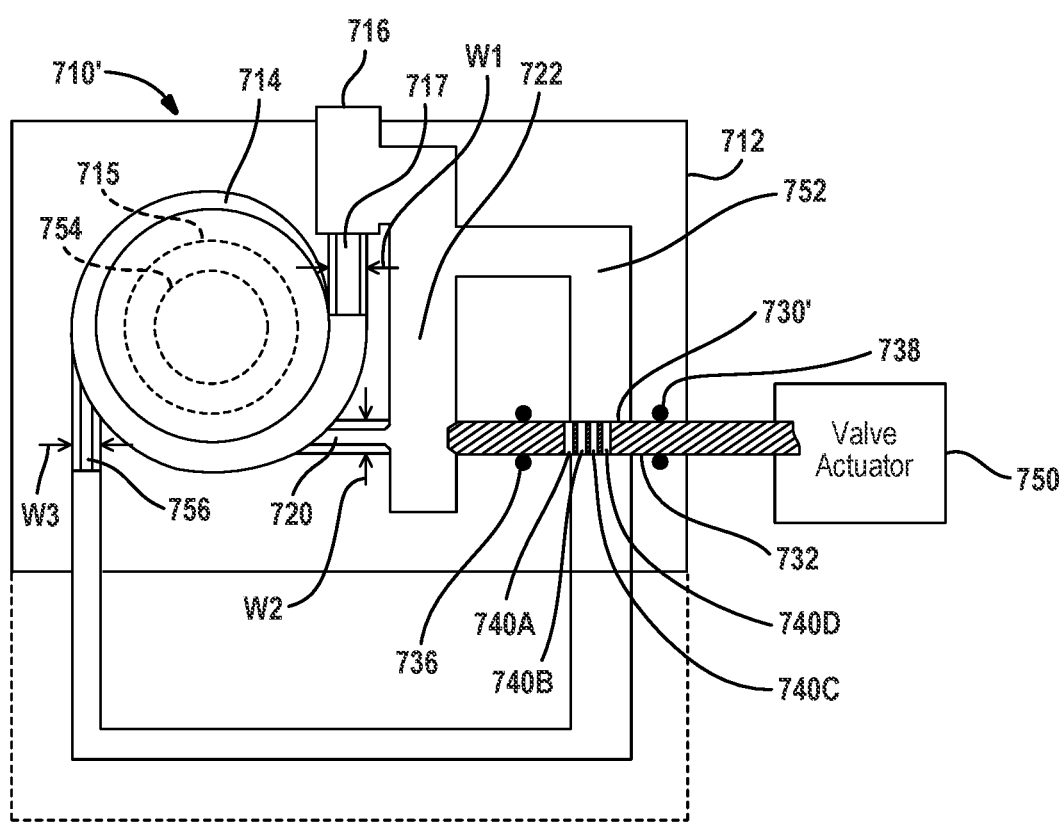
FIG. 7F is a cross-sectional view of a turbocharger having two auxiliary channels and nozzles in a third position with the valve stem completely opened and ports aligned with the second auxiliary channel.

The valve stem 730' of the valve assembly includes ports 740A, 740B, 740C and 740D. The ports 740A-D, in this example, are within the second auxiliary passage in which they are present or partially present during some of the positions of the valve stem 730'. In FIG. 7D, the ports 740A-D are not passing fluid therethrough and are between the first auxiliary channel 722 and the second auxiliary channel 752. In FIG. 7E, the ports 740A-740D are also not communicating fluid therethrough. In FIG. 7F the ports 740A-740D are all communicating a portion of the fluid from the inlet 716 therethrough so that the second auxiliary channel 752 has flow of fluid to the second nozzle 756. The size, shape and number of the ports 740A-740D may vary depending upon the desired flow characteristics to be achieved. Of course, a partial position is possible whereby fewer than all of the ports 740A-740D are exposed to and communicate fluid through the second auxiliary channel 752 toward the second auxiliary nozzle 756. Again, the number of ports and the number of ports exposed at any one time may vary depending upon the various operating conditions of the valve stem 730'. It should be noted that the valve stem 730' is perpendicular to a portion of the first auxiliary channel 722 and the second auxiliary channel 752. The valve stem 730' is coaxial with the first auxiliary nozzle 720. The valve stem 730' allows simultaneous control of both the first auxiliary nozzle 720 and the second auxiliary nozzle 756. A single valve actuator 750 may be used to move the valve stem 730'. The valve actuator may be hydraulic or electrical or manual.

As will be described in further detail below, the main nozzle 717 has a first width $W_1$, the first auxiliary nozzle 720 has a second $W_2$, and the second auxiliary nozzle 756 has a third width $W_3$. In one constructed example, the $W_1$ is greater than the $W_2$ which is in turn is greater than the third width $W_3$. Each of the nozzles are progressively downstream from each other. That is, the main nozzle 717 is located in a first position that is tangential to the circular shape of the volute 714. The nozzle 720 is located about 90° downstream from the main nozzle 717. The nozzle 720 is perpendicular to the direction of the main nozzle 717. The nozzle 756 is perpendicular to the nozzle 720 and parallel to the main nozzle 717. The second auxiliary nozzle 756 is about 90° downstream of the first auxiliary nozzle 720 and therefore also downstream of the main nozzle 717.

The housing 712 may be extended as is illustrated in the dashed lines. The housing may thus incorporate the second auxiliary channel 752 therein. However, the dotted portion of the housing may be removed and external piping may be used to form at least a part of the second auxiliary channel 752.

Figure 7G:
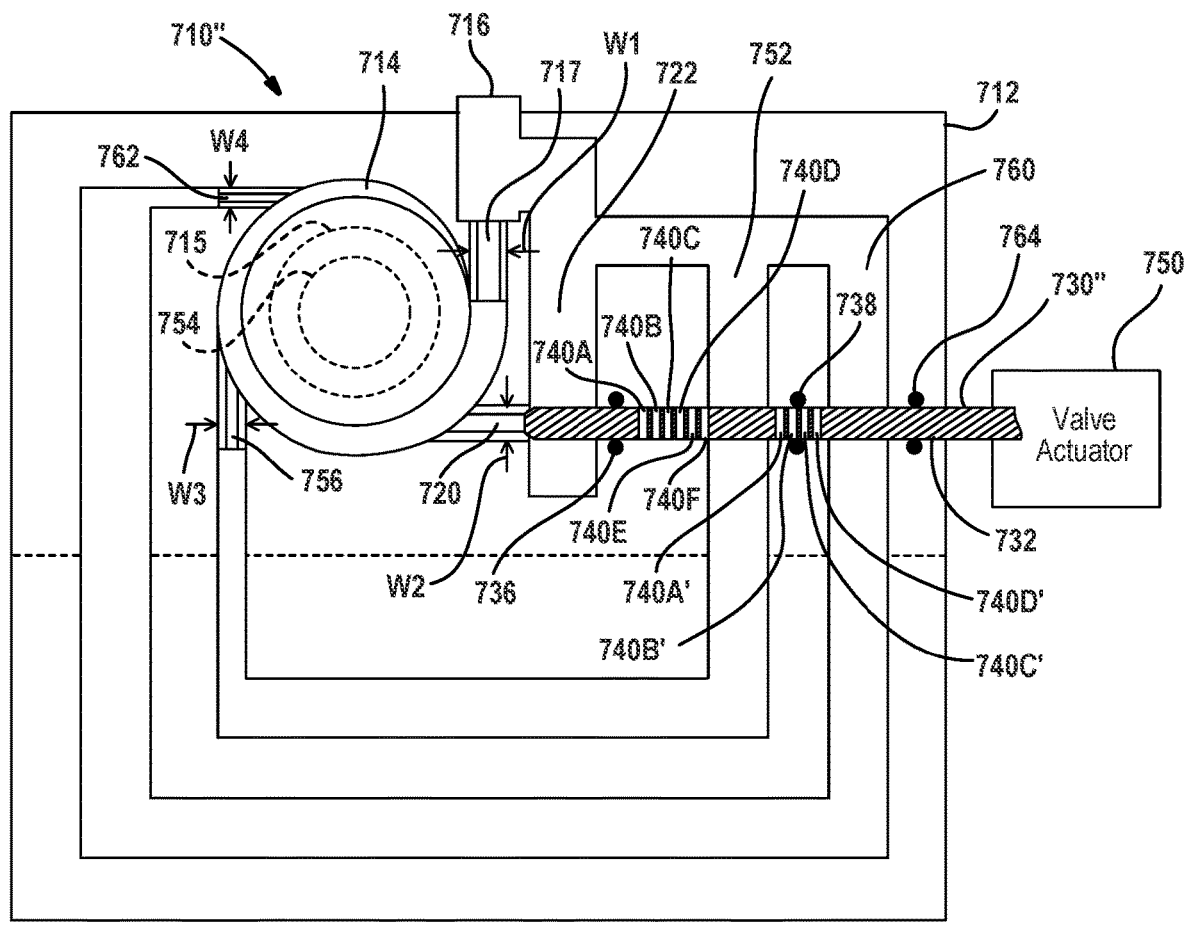
FIG. 7G is a cross-sectional view of a turbocharger having three auxiliary channels and three auxiliary nozzles.
Figure 7H:
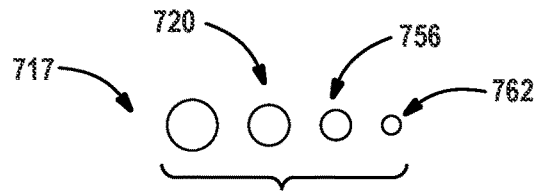
FIG. 7H is a diagrammatic representation of the relative sizes or effective areas of the main nozzle relative to the auxiliary nozzles.

Referring now to FIG. 7G, a third auxiliary channel 760 communicates a fourth portion of the fluid from the inlet 716. As mentioned above, when the turbocharger 710″ is used in the examples of FIG. 6, the fluid is the second brine stream. The second auxiliary channel 760 communicates the fluid stream to a third auxiliary nozzle 762. The third auxiliary nozzle 762 is disposed perpendicular to the second auxiliary nozzle 756. The third auxiliary nozzle 762 is also perpendicular to the main nozzle 717 and parallel to the first auxiliary nozzle 720. The third auxiliary nozzle 762 has a width $W_4$ which is less than the width $W_3$ of the nozzle 756. The widths of the nozzle correspond to an effective area. The effective area is the area open for fluid to flow therethrough. The widths refer to the diameter should the cross-sectional shape of the nozzles be round. However, other nozzle cross-sections are possible. The effective area of the nozzles decrease downstream as the distance from the main nozzle increases. A seal 764 is disposed adjacent to the valve stem 730 to seal the second auxiliary channel 760 relative to the exterior of the turbocharger housing 712.

In this example, the valve stem 730″ of the valve assembly has a second set of ports 740A′, 740B′, 740C′ and 740D′. The ports may be positioned in various positions relative to the first set of ports 740A-740D. That is, when the valve stem is moved to the right in FIG. 7G, both set of ports may align with their respective auxiliary channels. However, the ports 740A′-740D′ may be offset to the right or the left. That is, fluid may be allowed to flow through the second auxiliary channel 760 through the second set of ports 740A′-740D′ before or after fluid flows through the first set of ports 740A-740D and the second auxiliary channel 752. Extra ports may be added to obtain the desired effect. For example, more ports in the first set of ports may be added so as the second set of ports is gradually aligned the first set of ports maintaining flow. In this example ports 740E, 740 F were added. Fluid may begin to flow but when the second set of ports are fully aligned ports 740E, 740 F may be non-flowing and be positioned between the second auxiliary channel 752 and the third auxiliary channel 760.

Figure 7I:
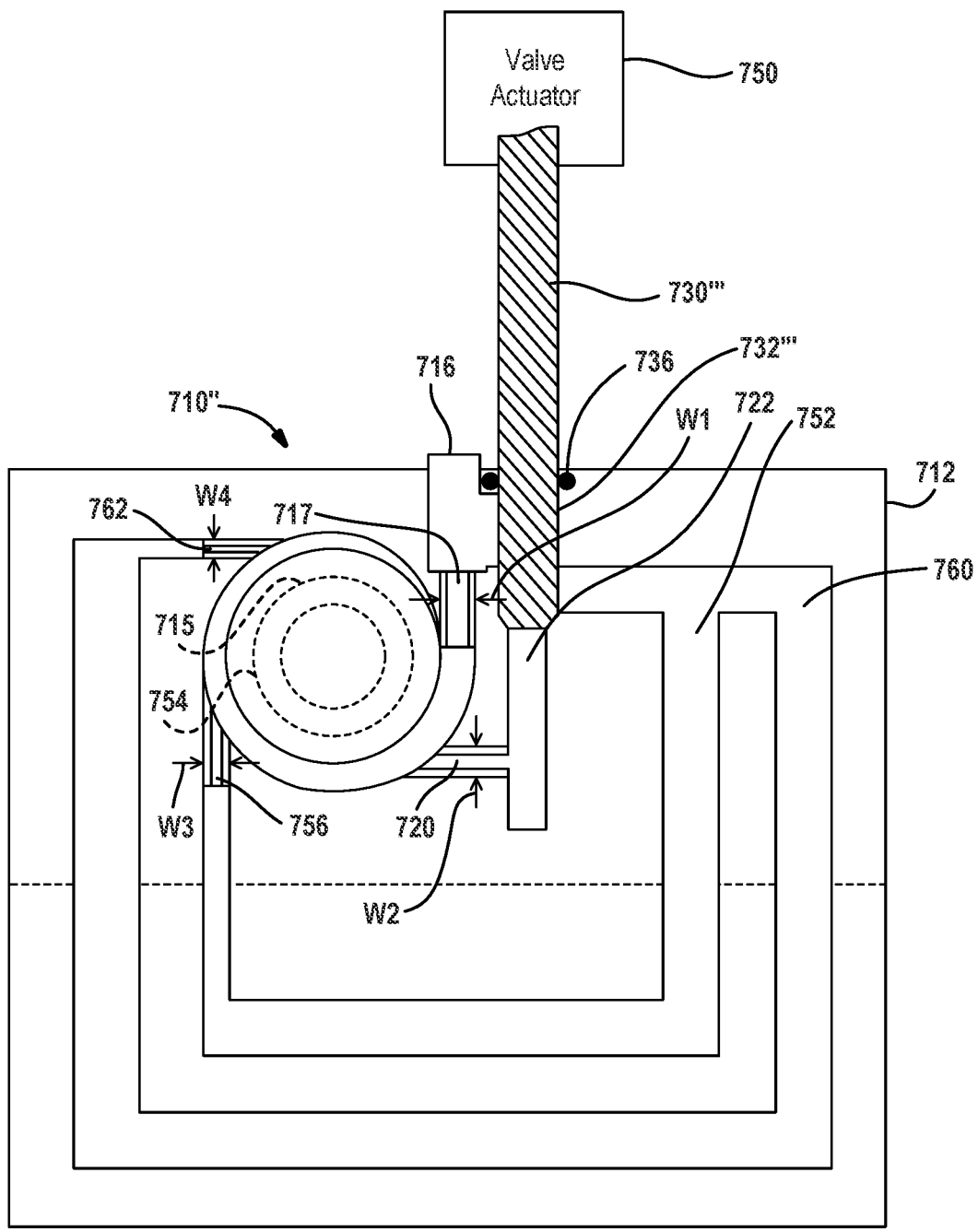
FIG. 7I is a cross-sectional view of a turbocharger having three auxiliary channels and a single valve stem that controls each, shown in the closed position.
Figure 7J:
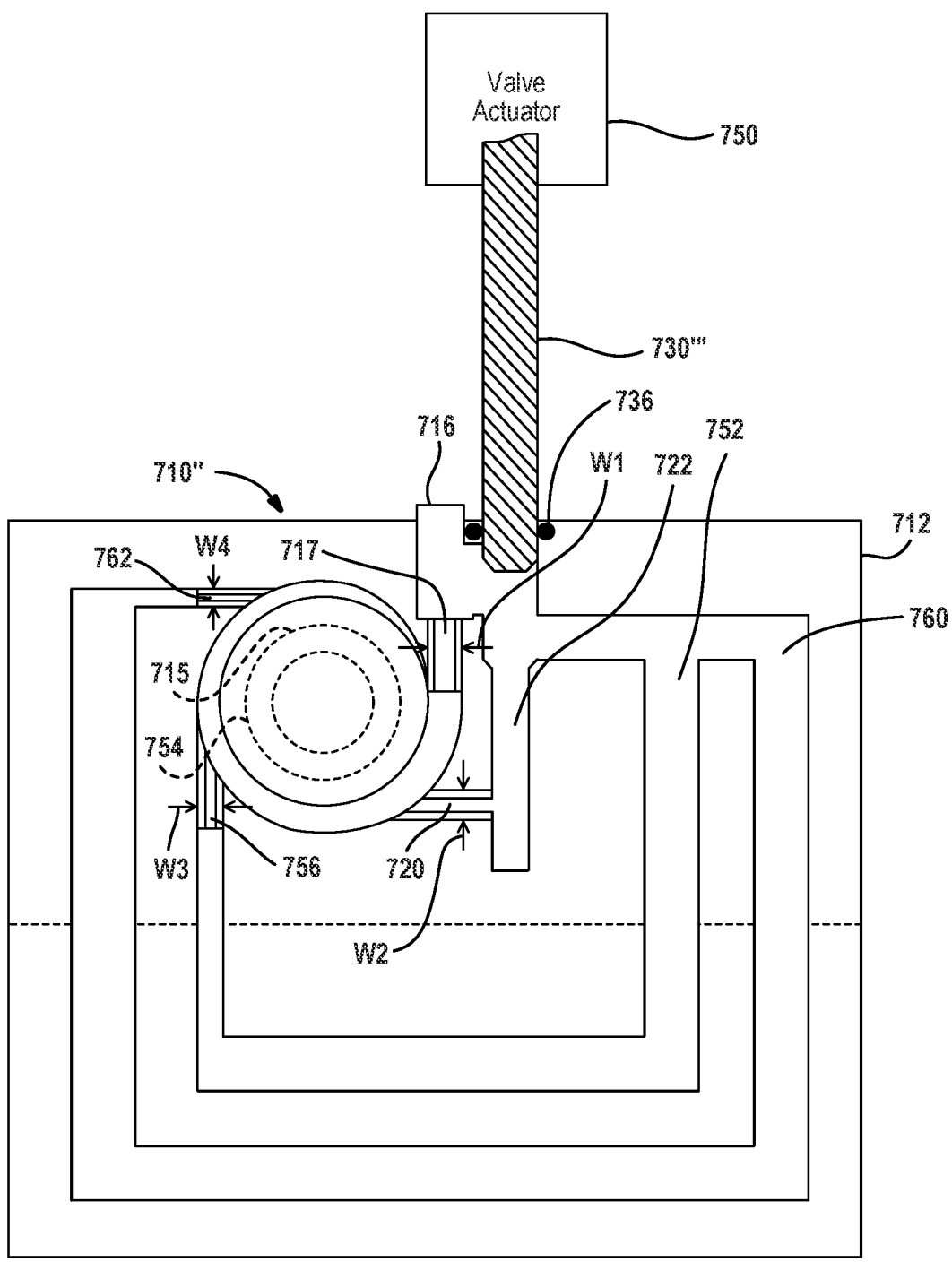
FIG. 7J is a cross-sectional view of a turbocharger having three auxiliary channels and a single valve stem that controls each, shown in the opened position.

Referring now to FIGS. 7I and 7J, the valve assembly is a single valve stem 730‴ within a valve stem channel 732‴ that is shown in a position to close the fluid flow or open the fluid flow to all of the auxiliary channels 722, 752, and 760. Thus, the control of the turbocharger is fairly straightforward in FIGS. 7I and 7J. Also, in this example, a portion of the second auxiliary channel 752 and the third auxiliary channel 760 may be disposed external to the housing 712.

In the examples of FIGS. 7A-7J, the valve stem positions may be controlled in response to various inputs such as the flow in various flow meters such as those set forth in FIG. 9A-15B. Likewise the examples of FIGS. 8A-D, the flowmeters in FIG. 9A-15B may be used to adjust the flow though the nozzles by controlling the valve stem positions.

Figure 8A:
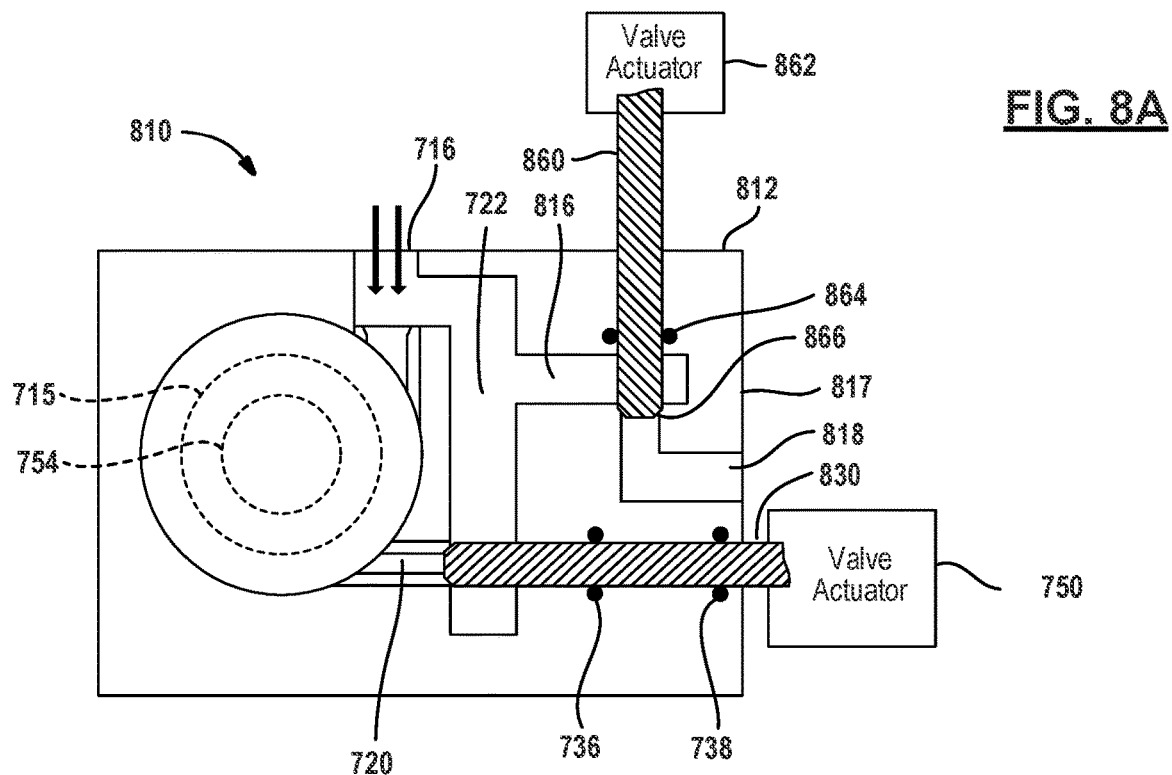
FIG. 8A is a cross-sectional view of a turbocharger having independent control of a bypass valve stem and an auxiliary nozzle.
Figure 8B:
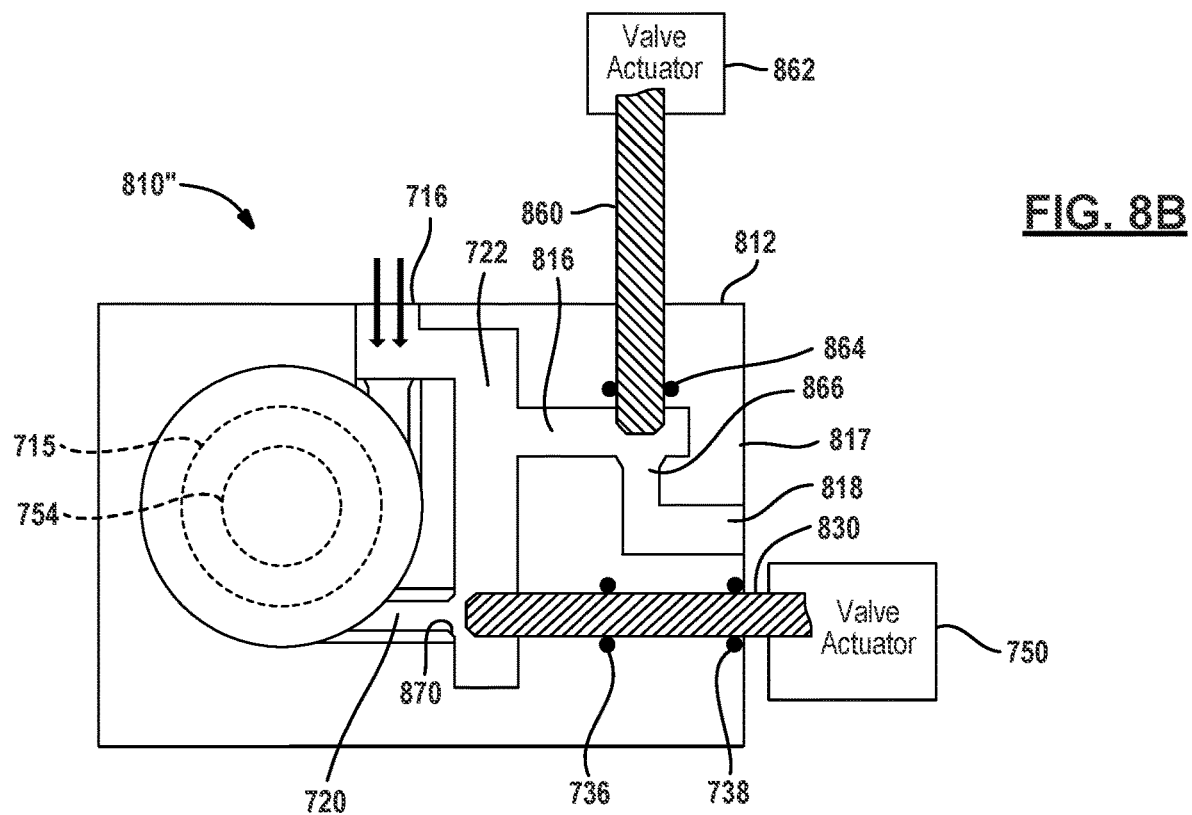
FIG. 8B is a cross-sectional view of the turbocharger of FIG. 8A having the bypass channel valve stem in an open position.

Referring now to FIGS. 8A-8B, a turbocharger 810 is illustrated having a housing 812. The same parts are labeled the same from that set forth in FIG. 7A-7B. In this example, the auxiliary channel 722 and the inlet 716 are configured in the same manner. However, in this example a bypass passage 816 is illustrated having a different configuration than that set forth in FIG. 7A-7C. In this example the bypass passage 816 passes through an outer wall 817 but does not cross the path of the valve stem 830 of the valve assembly. The valve stem 830 is modified from that is set forth in FIGS. 7A-7C by not including the ports 740A-740D. One of the seals 736, 738 may also be removed. In this example the valve actuator 750 actuates the valve stem 830 to open and close the auxiliary nozzle 720 without regard to the bypass passage 718.

In this example, the valve assembly includes a second valve stem 860 is illustrated within the bypass passage 816. That is, the valve stem 860 under movement of the actuator 862 opens and closes the bypass passage 816 independently from that of the valve stem 830. The valve stems 830 and 860 are perpendicular to each other in this example. The valve stems 830 and 860 do not cross paths. A seal 864 seals the bypass passage 816 from the environment through the housing 812. The valve stem 860 seals against a valve seat 866 when closed.

In FIG. 8B, the valve stem 860 is shown in a withdrawn manner to allow flow to flow through the bypass passage 816 to an outlet 818. Valve stem 830 may be in any position relative to the position of the valve stem 860.

Valve seat 870 seals valve stem 830 against the opening of the auxiliary nozzle 720 to seal flow from entering the auxiliary nozzle 720.

Figure 8C:
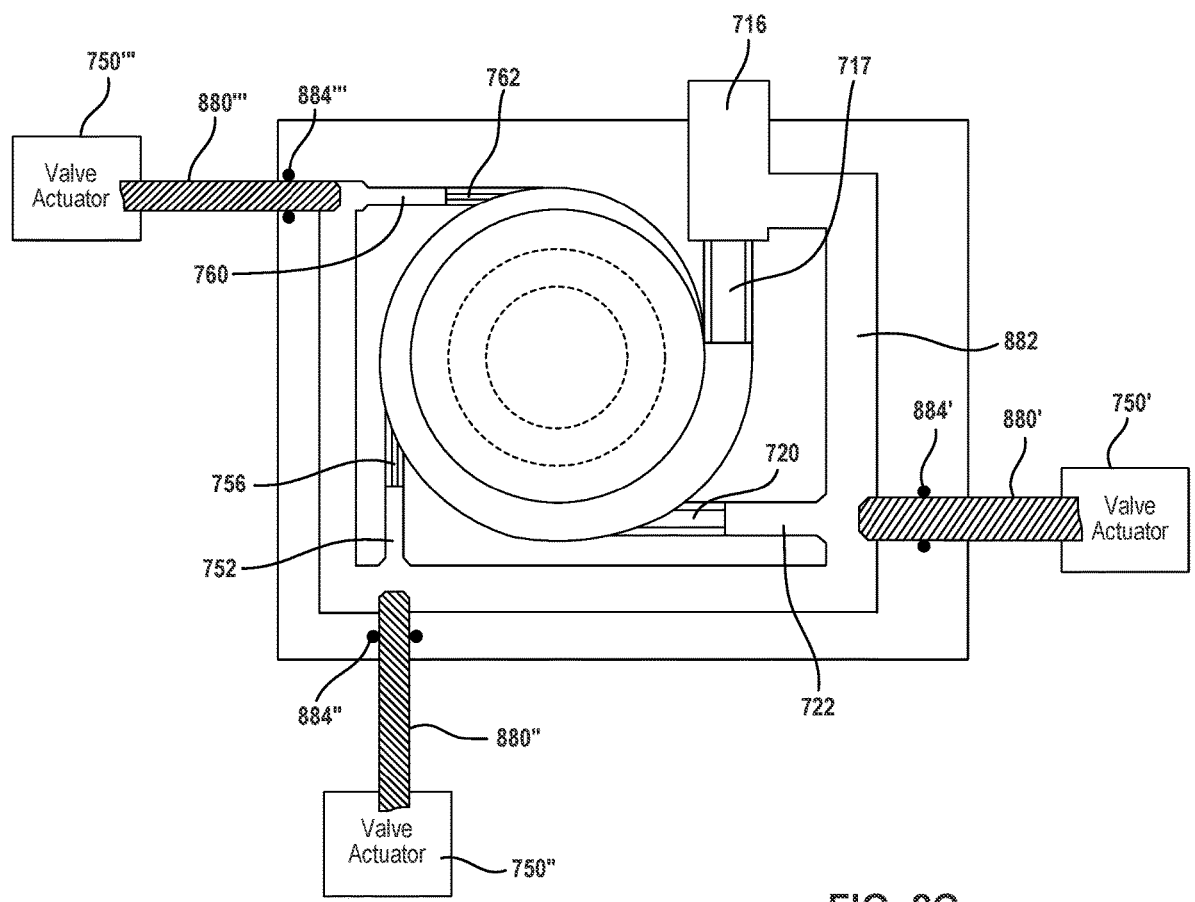
FIG. 8C is a cross-sectional view of a turbocharger having three independently control valve actuators controlling three valve stems for three auxiliary nozzles.

Referring now to FIG. 8C, a plurality of valve actuators 750′, 750″ and 750‴ are used to individually control the valve stems 880′, 880″ and 880‴ of the valve assembly, respectively. In this example, the valve stem 880′ blocks the flow to the nozzle 720 and first auxiliary channel 722. When flow is desired to flow into the first auxiliary nozzle 720, the valve stem 880′ is withdrawn by the valve actuator 750′. In this example, the valve stem 880′ does not block the flow of fluid from the inlet 716 through a main auxiliary channel 882. The valve stem 880′ is not as wide as the main auxiliary channel 882 so fluid can travel to the other branches. That is, the main auxiliary channel 882 branches into the first auxiliary channel 722, the second auxiliary channel 752 and the third auxiliary channel 760. The valve actuator 750″ and valve stem 880″ blocks the second auxiliary channel 752. The valve stem 880‴ is controlled by the valve actuator 750″ to open the third auxiliary channel 760 to allow fluid to flow to the third auxiliary nozzle 762. Thus, the valve actuators 750′, 750″ and 750‴ selectively control the valve stems 880′-880‴ to independently provide the fluid from the inlet 716 to the volute 714. That is, one or more of the nozzles 720, 756, 762 may provide fluid from the inlet to the volute. One method for this is described below in FIG. 8D. Seals 884′, 884″ and 884‴ are used to seal leaks from inside the turbocharger and more specifically the channels 760, 882. One advantage of the configuration of FIG. 8D is that three independently controlled nozzles draw from a common manifold so that any sequence or combination of nozzles may be used to communicate fluid to the volute.

Figure 8D:
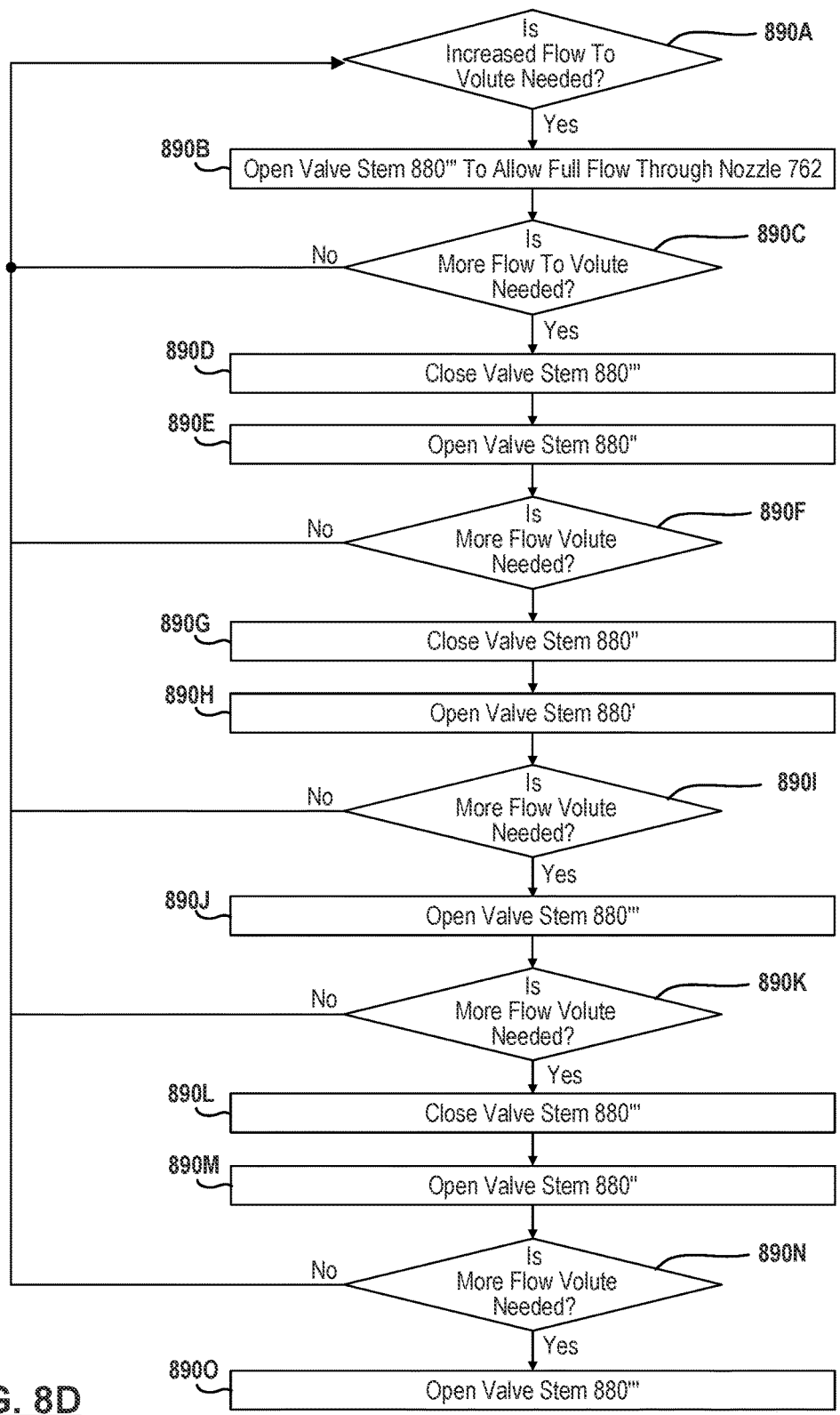
FIG. 8D is a flowchart of a method of operating the turbocharger of FIG. 8C.

Referring now to FIG. 8D, one sequence of the operation of the auxiliary nozzles is set forth. Experience has shown that operating a nozzle at maximum flow rate is most efficient. During this process the main nozzle is not valve actuated and provides fluid from the turbocharger inlet to the volute. In step 890A, the system determines whether an increase of flow to the volute is needed above that from the main nozzle alone. As mentioned above the flowmeters of FIGS. 9A-15B may be used in the determination of the nozzle valve settings. If increased flow to the volute is needed in step 890A, step 890B opens the valve stem 880″ to allow full flow of fluid through the nozzle 762 to the volute as a third auxiliary nozzle valve setting. The need is assessed by comparing the flow rate signals from the flow rate sensors. The optimal flow rates varies over the operating conditions and the age of the membrane. Such values are calibrated into the controller during development of the system. After step 890B, if more flow to the volute is needed in step 890C, step 890D closes the valve stem 880'''. In step 890E, the valve stem 880'' is opened to allow flow to the volute through the main nozzle and the second auxiliary nozzle as a second auxiliary nozzle valve setting.

If more flow to the volute is needed as determined in step 890F, valve, valve stem 880'' is closed in step 890G and the valve stem 880' is opened in step 890H as a first auxiliary nozzle valve setting until the desired flow is reached. If the desired flow into the volute is not reached as determined in step 890I, step 890J is performed if more flow is needed to the volute. In step 890J the valve stem 880''' is opened to allow flow to the volute through the man nozzle, the first auxiliary nozzle and the third auxiliary nozzle. Thereafter, if more flow to the volute is needed as determined in step 890K, valve stem 880'' is closed in step 890L In step 890M valve stem 880'' is opened to allow flow to the volte through the main nozzle, the first auxiliary nozzle and the second auxiliary nozzle. If still further flow to the volute is determined in step 890N, step 890o opens the valve stem 880'''. In Step 890o, all of the auxiliary valve stems 880', 880'' and 880''' are opened and a maximum amount of flow to the volute is achieved. Thus, fluid flows from the inlet of the turbocharger through the main nozzle and the three auxiliary nozzles. When no more flow is needed in steps 890C, 890F, 890I 890K and 890N, step 890A is repeated. All the positions of the nozzle valves above are determined as nozzle valve settings based on the desired flow rates of the system. Should more than 1 turbocharger be used each of those auxiliary nozzle valves are controlled according to auxiliary nozzle valve settings In the foregoing examples of FIGS. 7D-J and 8C, simply making the auxiliary nozzles larger does not serve the need to provide more fluid to the volute effectively. When the nozzle area relative to the volute cross-section area is too great at any one nozzle, the pressure in the region, when the nozzle is fully open, is increased to a point where uneven flow enters the impeller and results in a non-uniform flow through the impeller vanes. This may cause localized cavitation and high radial axial thrust on the impeller which may allow the shaft bearing capacity to be exceeded.

The total auxiliary nozzle area is related to the volute cross section. Experimentally, it has been found that the auxiliary nozzle area should not exceed 30% of the volute cross sectional area. By providing multiple auxiliary nozzles, a greater flow of area to be injected into the volute without producing locally excessive flows and pressures is achieved. Also, as it has been experimentally found that the auxiliary nozzles in cross section areas should not exceed about 60% of the main nozzle area. All of the nozzles in the above examples are placed about 90° apart to distribute the fluid within the volute, although various other distances may be performed. Ninety degrees allows the manufacturability of the system to be increased. In FIG. 8C, the valve stem and nozzle entrance is contoured such that when the valve stem is withdrawn, a concentric jet of high velocity fluid is formed which can propagate into the volute increasing the average velocity of the volute flow thus allowing more torque to be imparted on the turbine impeller.

Referring now to FIG. 9A, a separation system such as reverse osmosis system 910 is set forth. To achieve a maximum benefit, each interstage energy recovery device should produce the desired amount of feed pressure boost to attain the permeate production requirement and uphold the brine flow at a set value. Further, each pressure vessel in each stage should have approximately the same feed flow, brine flow and permeate flow. All or nearly all of the brine hydraulic energy may be recovered regardless of the amount of pressure boost required by the energy recovery devices. In seawater reverse osmosis systems, the hydraulic energy required for optimal interstage pressure boosting is significantly lower than the amount of available energy so a means is needed to recover the remaining energy. In brackish reverse osmosis systems, insufficient brine energy may be available thus requiring means to add energy to the interstage boosting process. The reverse osmosis system 910 illustrated in FIG. 9A obtains these improved results.

The reverse osmosis 910 has a high pressure pump 920 that acts as a feed pump. The high pressure pump 920 communicates high pressure fluid to the turbocharger 922. The turbocharger 922 has a pump portion 924 and a turbine portion 926. The pump portion 924 pressurizes the fluid from the high pressure pump 920 to a higher pressure and communicates the higher pressure fluid through an inlet pipe 928 prior to entry within the pressure vessel 930. Although only one pressure vessel is illustrated multiple parallel pressure vessels may be provided. The permeate generated from the pressure vessel 930 is communicated to a permeate manifold 932. A second pressure vessel 936 is also provided in the system. Again, the pressure vessel 936 may be one pressure vessel or a plurality of pressure vessels in parallel. The pressure vessel 936 receives brine communicated from the pressure vessel 930. That is, the pressure vessel 930 has a brine outlet 938 that communicates brine to a second turbocharger 940. A turbocharger 940 has a pump portion 942 and a turbine portion 944. The pump portion 942 increases the pressure of the brine fluid within the pump portion 942. The brine fluid with increased pressure is communicated to an inlet pipe 946 of the pressure vessel 936 (or in the case of multiple pressure vessels to each of the pressure vessels).

The outlet of the pressure vessel 936 is both permeate and brine. The permeate of the pressure vessel 936 is communicated through a pipe 950 to the permeate manifold 932. The brine outlet 954 of the pressure vessel 936 is communicated to the inlet of the turbine portion 944 of the turbocharger 940.

The turbine portion 926 of the turbocharger 922 may also be in communication with a motor 960. The motor 960 has a shaft 961 that rotates with the pump portion 924 and the turbine portion 926. The motor may be in electrical communication with a power supply 962. The power supply 962 may provide power to the motor or receive power when the motor 960 acts as a generator.

Each turbine portion 926 and 944 may be configured with a respective bypass valve 964,966. As illustrated in FIGS. 7 and 8, both bypass valves and auxiliary nozzles may be included within the turbines 926 and 944. The external bypass valve 964 and 966 may pass fluid around the turbine portions 926 and 944 respectively. The bypass valves 964 and 966 may be internal to the turbine portions 926, 944.

A controller 970 is in communication with a first flow meter FM1 and second flow meter FM2 through a data line 972. The flow meter FM1 is disposed to receive the permeate outlet flow of the first pressure vessel 930 and generate a first permeate flow signal. The second flow meter FM2 is disposed to receive the permeate outlet of the second pressure vessel 936 and generate a second permeate flow signal. A controller 970 may monitor the flow signals of the outputs of both of the pressure vessels 930, 936 individually.

As was the case above with respect to FIG. 6A, the turbine portion 944 communicates the brine flow from the second pressure vessel 936 to the turbine 926 through a pipe 963. That is, all of the flow from the second pressure vessel 936 is communicated through both the turbine portion 944 and the turbine portion 926. Ultimately, the turbine outlet 974 is measured by a flow meter FM3 which is in communication with the controller 970 through the control line 976. The flow meter FM3 generates a third flow signal corresponding to brine flow through the system. Flowmeter FM3 can be placed anywhere in the second brine stream such as in pipe 754 or 763. The turbine 926 ultimately communicates the brine fluid to drain 978. Preferably, most of the energy of the brine fluid has been recovered within the series formation of the turbines 926 and 944.

The controller 970 is also in electrical communication with the control lines 981 and 983. Further, the bypass valve actuators (not specifically illustrated) associated with valves 964, 966, 980 and 982 may also be controlled by the controller 970 using the control lines 981, 983 in response to the flow signals.

A control line 983 may be used to control the motor 960 in response to the flow signals. It is also known that various other sensors such as pressure indicators, salinity meters, and temperature indicators may all be used to monitor the membrane performance within the pressure vessels 930, 936. However, for clarity, they have been omitted from FIG. 9A.

In operation, adjusted auxiliary and bypass valves as well as any backpressure valves, if they are used, are used to obtain the brine flow requirements and generate the desired amount of pressure boost is desirable according to Equation 1:

$$P_{tc}=n*(Q_t/Q_f)*(P_t-P_{ex}) \quad [1]$$

$P_{tc}$=turbocharger feed pressure boost
n=transfer efficiency
$Q_t$=turbine flow
$Q_f$=feed flow
$P_t$=turbine inlet pressure
$P_{ex}$=turbine outlet pressure
Also
$Q_b$=brine flow from final stage
$Q_{by}$=brine bypass flow
$Q_t=Q_b-Q_{by}$ The value $P_t$ for the final pressure boosters established by the brine pressure of the final stage. For each successive energy recovery device $P_t=P_{ex}$ of the recovery device of the next higher stage. It is, in FIG. 6B, for example, $P_t$ for the energy recovery device 662 equals the brine pressure in the pipe 672. The energy recovery device 642 has a turbine inlet pressure $P_t$ equal to the turbine outlet pressure from the turbine portion 666. The turbocharger 632 has a turbine inlet pressure equal to the turbine outlet pressure of the turbine portion 646. The outlet pressure of the turbine portion 636 is about 15-20 psi or about 1.0-1.4 bar.

From the above Equation [1] reducing the turbine flow or increasing the turbine outlet pressure reduces the turbocharger feed pressure boost. The turbine flow can be reduced by closing the auxiliary nozzle while opening the bypass valve to increase the bypass flow to maintain the brine flow for the final stage. In FIG. 9A, for example, boost may decrease without changing the brine flow. The auxiliary nozzle valve 980 may be closed to reduce the turbine flow and hence reduce the pressure boost per the above equation but keep the brine flow constant. The bypass valve 966 may be opened to increase the bypass flow. Thus, simultaneous control of the brine flow as well as the feed pressure boost may be controlled. From analysis of membrane array performance, the permeate flow through a given area of a membrane, which may be referred to as flux or flux rate may be held constant along the entire membrane array of every stage. This can be approximated in a multistage system by keeping the average flux rate of each stage the same. Each pressure vessel in every state may have approximately the same feed flow, brine flow and permeate flow while increasing pressures from stage to stage to keep the net driving pressure approximately constant. Various process requirements may require a different permeate production. In such a case, every stage may be adjusted to maintain uniformity and feed flow, brine flow and permeate flow from each of the pressure vessels in each stage.

Referring now to FIGS. 9B and 9C a control scheme for a two stage system is illustrated. In FIG. 9B, the valve settings for control of the interstage turbocharger 940 are set forth if the (second in example) stage permeate flow rate $Q_p$ (from FM2) is too high (above a first threshold), a pressure boost from the turbocharger 940 may be reduced by closing the auxiliary valve as indicated by the down arrow in FIG. 9B in the top row. As well, the bypass valve 966 may be opened. If the permeate flow is too low (below a second threshold) as indicated by the flow meter FM2, the auxiliary valve is opened and the bypass valve is closed to increase boost. In the third row of FIG. 9B, if the brine flow is too high as indicated by FM3 (above a third threshold), the auxiliary nozzle valve 980 is closed and the bypass valve 966 is also closed. If the brine flow is too low (below a fourth threshold), the auxiliary nozzle valve 980 and the bypass valve 966 is opened to reduce the brine flow restriction.

When reviewing the equation, a combination of low permeate flow and high brine flow may appear contradictory in control action because the auxiliary valve would be adjusted in opposite directions. However, control logic would iterate the bypass valve to be increasingly closed until both the flow of permeate and the flow of brine have achieved set point values. It should be noted that there are no pairs of permeate flow and brine flow table entries that require exactly the same control valve adjustment thus providing the controller the necessary freedom to set all set points. The auxiliary valve 980 and bypass valve 966 are iteratively increasing opened or closed as the flow meter signals are monitored.

Referring now to FIG. 9C, a method for controlling the feed turbocharger 922 is set forth. The turbocharger 922 has the motor 960 as included in the control. By controlling the motor the auxiliary nozzle of the turbine portion 926 is allowed to be kept open to the highest degree and the bypass valve 964 of the turbine portion 926 may be closed as much as possible as a set point so that feed boost can be achieved with the motor power by either adding power by rotating the shaft of the pump portion 924 and turbine portion 926 for more boost or extracting power from the rotor of the turbocharger 922 to reduce the amount of boost. That is, in FIG. 9C when the permeate flow from FM1 is too high (above a fifth threshold) the auxiliary valve 982 is closed and the bypass valve 964 is open. Boost may be reduced from using the motor 960. When the permeate flow $Q_p$ is too high as indicated by the flow meter FM1, the auxiliary valve 982 is closed and the bypass valve 964 of the turbocharger 922 is opened. Boost may be reduced by using the motor 960 to extract power from the rotor of the turbocharger 922. As indicated in the second row of FIG. 9C when the permeate flow $Q_p$ is too low (above a sixth threshold) as indicated by the flow meter FM1, the auxiliary valve 982 is opened and the bypass valve 964 is closed. Boost may be increased by adding power to the motor 960 which in turn increases the rotational speed of the shaft 961 of the turbocharger 922. When the brine flow $Q_b$ is too high (above a seventh threshold) as set forth in the third row of FIG. 9C, the auxiliary valve 982 is closed and the bypass valve 964 is closed while the brine flow restriction is increased. When the brine flow is low (below an eighth threshold) the auxiliary valve 982 is open and the bypass valve 964 is open. Thus, the brine flow restriction may be reduced.

Figure 10:
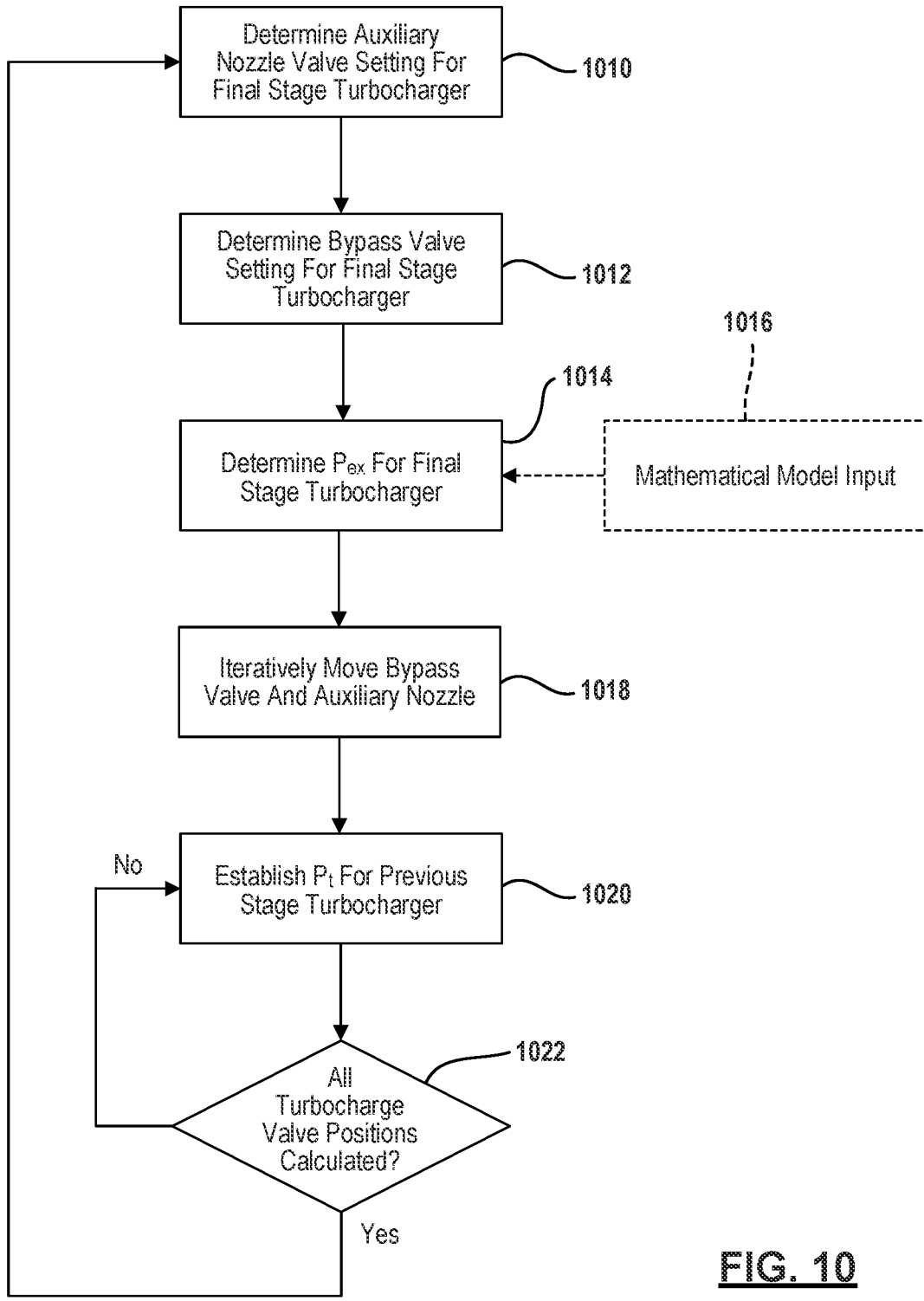
FIG. 10 is a flowchart of a method for operating the reverse osmosis system of FIG. 9A.

Referring now to FIG. 10, a summary of the method for controlling the energy recovery devices such as the turbochargers in the various stages are set forth. In step 1010 the bypass valve setting for the final stage turbocharger is determined by its controller. In step 1014 the $P_{ex}$ for the final stage is determined. This may be calculated or may use a mathematical model 1016 as an optional input. When a mathematical model 1016 is used the membrane performance may be approximated. The valves may be iteratively moved toward the determined setup in step 1018. Thus, the controller may reduce the number of valve adjustment iterations by saving time for the membrane array to reach the desired operating conditions. In step 1020 the $P_t$ for the previous turbocharger stages is determined. In the example set forth in FIG. 9A this corresponds to turbocharger 922. In the turbine inlet $P_t$. In step 1022 if all of the turbocharger valve positions are not done, step 1020 is repeated until all the turbocharger valve positions after all the turbocharger valve positions have been determined step 1022 is again repeated. The valves are continually moved toward the determined nozzle valve settings iteratively.

Figure 11:
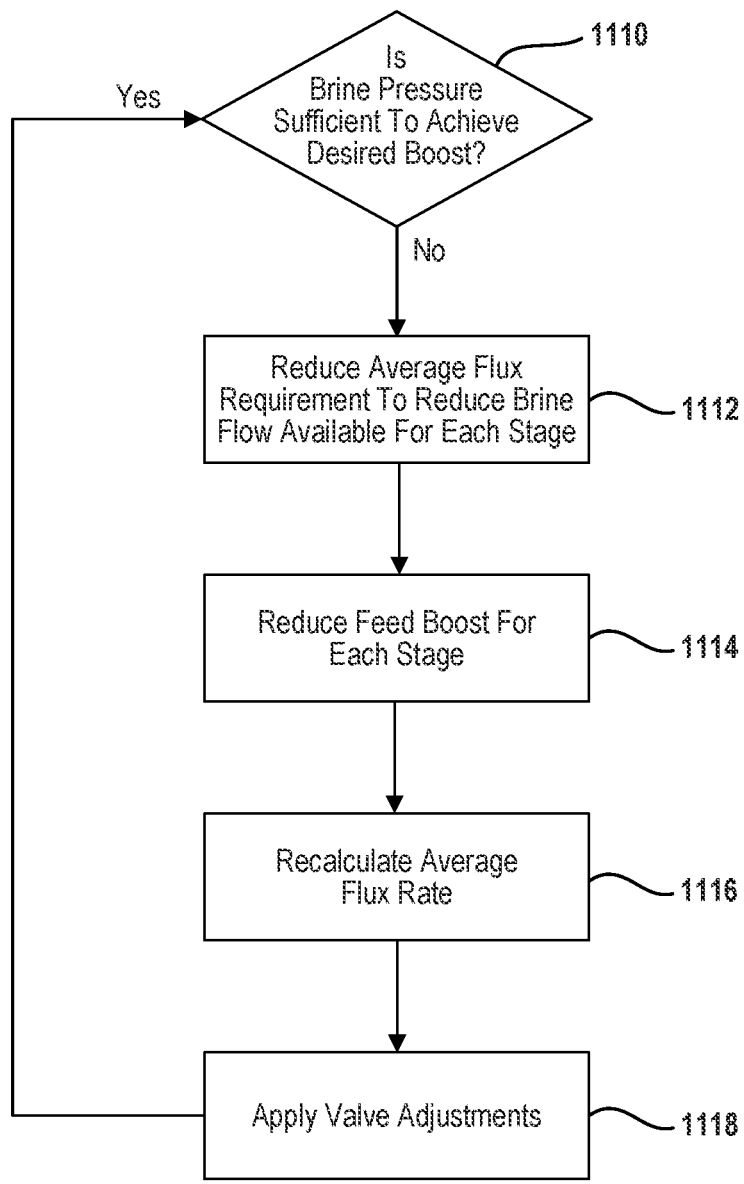
FIG. 11 is a flowchart of a method for operating a reverse osmosis system when the brine pressure is insufficient to achieve a desired boost.

Referring now to FIG. 11, various unanticipated conditions may be presented in which the brine pressure may be insufficient to achieve the desired boost. The controller may change the average flux requirement. In step 1110 it is determined whether the brine pressure is sufficient, to achieve the desired boost. If the brine pressure is sufficient normal operating conditions such as that set forth in FIG. 10 are performed. In step 1112 the average flux requirement is reduced by the controller to reduce the brine flow available for each stage. In step 1114 the feed boost for each stage is reduced by the controller. In step 1116 the average flux rate is recalculated by the controller for the system. In step 1118 the valves are adjusted. Step 1110 is then again performed after 1118. Interim adjustments will continue. It should be noted that the unanticipated conditions may reduce the permeate production in rare cases. However, the membrane array will be operating at a minimum energy consumption and the membranes will be protected against excessive fouling.

The energy recovery devices set forth in the above examples may have a customized hydraulic design such that the hydraulic range overlaps as much as possible in the anticipated flow and the pressure ranges. Thus, the maximum energy recovery is obtainable and excepted permeate reduction is achieved under normal operating conditions. For the interstage energy recovery devices when motors are not used, only one combination of auxiliary valve and bypass valve positions for any particular feed boost and brine flow rate suitable. For the feed energy recovery device (the first stage), the required pressure for the first state is assured by use of a motorized energy recovery device or a variable discharge pressure from the high pressure pump. That is, the motor 960 may be coupled to the high pressure pump 920 so that a varied amount of pressure boost may be easily controlled into the first pressure vessel 930.

Referring now to FIG. 12A, the system of FIG. 9A has been modified to include an alternate location for various the flow meters. The flow meters FM1 and FM2 in FIG. 9A are in the direct permeate stream. The determination of the amount of permeate being produced by each of the stages is important. However, the permeate may also be measured by an alternate location for the first flow meter at FM1'. FM1' is the total flow of permeate through the system. If the overall permeate flow is known and all the other permeate streams are known except for one, the other permeate stream may be determined by subtraction. That is, to find the amount of permeate generated in FIG. 12A, FM1' minus FM2 may be used to obtain the permeate from the first stage.

Another difference in FIG. 12A is the location of the determination of the overall flow of the system. The overall flow entering the system is the same as leaving the system. That is, in FIG. 9A, flow meter FM3 measures the amount of brine generated in the last stage that together with the overall permeate flow may be used to obtain the amount of fluid entering the system. In FIG. 12A, the flow meter FM3' may replace flow meter FM3 and thus the amount of flow to the system Qf may be determined. The amount of brine from the last stage may be obtained by subtracting the permeate output Qptot amount from the flow meter FM3'.

Another difference in FIG. 12A is that the high pressure pump 920 may be controlled by a variable frequency drive pump 920. Although not illustrated, the controller 970 is used to control the frequency of the variable frequency drive which changes the speed of the high pressure pump 920.

The bypass valves illustrated in FIG. 9A are not illustrated in FIG. 12A. It should be understood that external bypass valves may be used in the control. However, the control may use internal bypass valves as illustrated in FIGS. 7A-8B.

Another difference from FIG. 9A is the incorporation of a variable frequency drive 1210. The operation of the variable frequency drive is controlled by the controller 970. To adjust the control of the variable frequency drive 1210, the frequency commanded by the controller 970 may change.

Referring now to FIG. 12B, the operation of the system is set forth. When the total flow of permeate Qptot is high, the controller 970 commands the variable frequency drive 1210 to reduce the frequency to the high pressure pump to decrease the speed of the high pressure pump 920. Thus, the overall feed pressure decreases. When the overall flow of permeate is permeate Qptot is low, the frequency of the variable frequency drive 1210 is increased and the high pressure pump increases in speed to increase the feed pressure.

When the permeate flow from the second stage Qp2 is high, the actuator of the nozzle 980 closes and the turbine nozzle of the turbine 944 is closed to increase the brine resistant. When the permeate flow from the second stage Qp2 is low, the actuator for the nozzle valve 970 is commanded to open and thus the turbine nozzle at the turbine 944 is opened to decrease the brine resistant.

When the flow of brine from the last stage Qr is high, the actuator associated with the nozzle valve 982 is commanded to close which closes the turbine nozzle within the turbine 926 which increases the resistant of the brine.

When the amount of brine flow is low, the actuator associated with the nozzle valve 982 is opened and thus the turbine nozzle is opened to decrease the resistant of brine. The amount of flow Qr through the turbines 926, 944 are the same.

The amount of brine bypass thus is increased or decreased depending on the opening of the turbine nozzle. When the turbine 944 needs to provide extra boost to maintain the permeate flow Qp2, a nozzle is restricted to increase the change in pressure and thus provide more boost so that Qr is kept the same despite a restricted nozzle. A restricted nozzle at turbine 944 means that the change in pressure on the turbine 926 is reduced to increase the change in pressure for the turbine 944. A reduction of the pressure drop on turbine 926 automatically occurs by the controller 970 to open the nozzle 982 to keep the brine flow constant.

When turbine 944 needs to provide less boost to maintain Qp2, the nozzle size is increased to reduce the turbine pressure drop to provide less boost. However, Qr needs to keep the same despite the lower flow restriction. To accomplish this, the nozzle 980 is opened so that the pressure drop at turbine portion 926 is increased to reduce the pressure drop at turbine 944. An increase in the pressure drop at turbine 926 automatically occurs with the controller 970 command to close the nozzle at turbine 926 to keep the brine flow constant.

Referring now to FIG. 13A, the system of FIG. 12A has been modified. The modification corresponds to the use of a variable frequency drive 1310 and a motor 1312 coupled to the turbocharger 922, thus the control velocity is the same except that the pressure provided by the turbocharger 922 is controlled by a signal from the controller 970 to the variable frequency drive 1310 to drive the motor 1312 attached to the rotating portion of the pump and turbine. The variable frequency drive 1210 is thus optional. That is, the high pressure pump 920 can provide a "base" level of pressure increase to the feed stream which can then be adjusted by changing the speed of the pump portion 924 coupled to the turbine portion 926 of the turbocharger 922.

Referring now to FIG. 13B, when the overall permeate flow Qptot is high, the controller 970 reduces the frequency controlled by the variable frequency drive 1310 to decrease the speed of the turbine 926 of turbocharger 922 which decreases the feed pressure. When the overall permeate flow Qptot is low, the frequency commanded by the controller 970 to the variable frequency drive 1310 is increased to increase the speed of the rotor of turbocharger 922 which, in turn, increases the feed pressure through the pump 924.

When the second stage permeate flow Qp2 is high, the actuator associated with the turbine nozzle is commanded to close which closes the valve 980 and thus increases the brine resistance. When the permeate flow Qp2 is low, the actuator of the nozzle 980 is commanded to open which opens the nozzle of the turbine 944 which, in turn, decreases the brine resistance. When the overall brine from the last stage is high, the actuator associated with the nozzle 982 is commanded to close which, in turn, closes the nozzle of the turbine 926 which increases the resistance of the brine through the system. When the flow of brine is low, the actuator of the nozzle 982 is commanded to open which, in turn, opens the turbine nozzle associated with the turbine 926 which decreases the brine resistant of the system.

Figure 14:
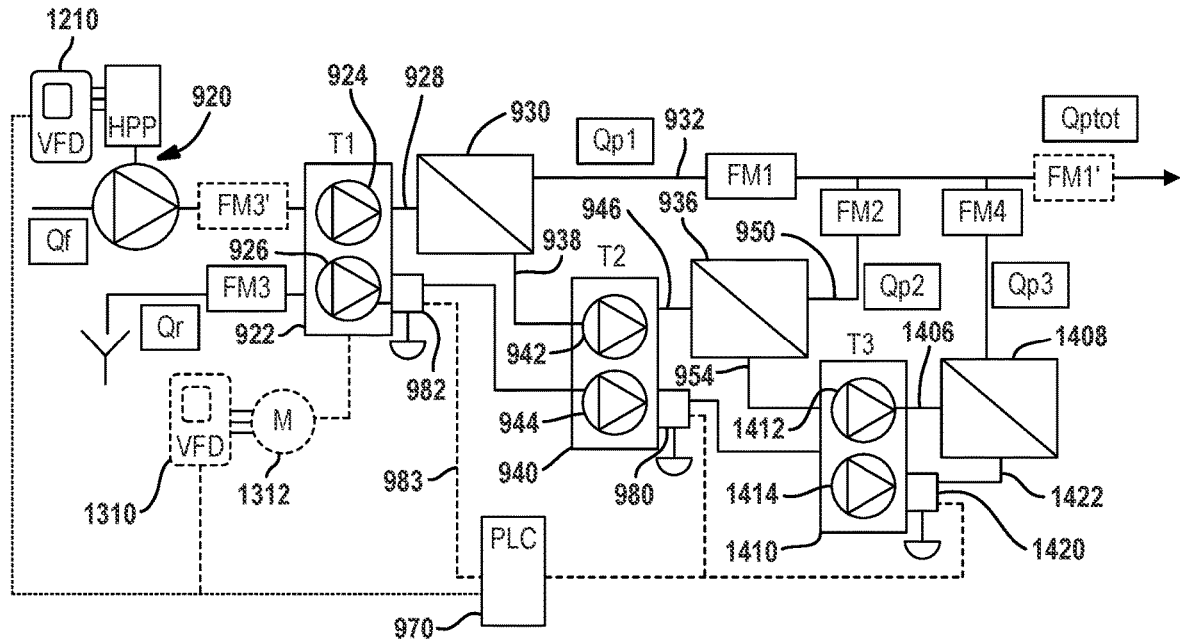
FIG. 14 is a block diagrammatic view of a fourth example of a reverse osmosis system having three stages according to the present disclosure.

Referring now to FIG. 14, the system illustrated in FIG. 12A or 13A may have additional stages. In FIG. 14, a third stage has been added. However, many more stages may also be added. However, when multiple stages are added, not all of the stages may require a turbocharger therebetween. To add a third stage, a fourth permeate flow meter FM4 is added to a third pressure vessel 1408. That is, the permeate output of the pressure vessel 1408 corresponds to the output signal of the flow meter FM4. As mentioned above, the overall flow rate of the system may be determined by a flow meter at each of the permeate outlets or by a permeate flow meter at each of the outlets except one and by an overall flow rate measuring Qptot. The sum of the permeate signals except the missing one can be subtracted from the flow associated with flow meter FM1' to determining the unknown permeate flow.

In the example set forth in FIG. 14, the inlet 1406 to the pressure vessel 1408 is received through the pump 1412 of the turbocharger 1410 which is the brine from the brine outlet 954 of the pressure vessel 936.

The nozzle 1420 receives brine from the final pressure vessel 1408 from the brine outlet 1422 of the pressure vessel 1408. The brine, through the nozzle 1420, is communicated through the turbine portion 1414 of the turbocharger 1410 which, in turn, is communicated to the turbine 944 of the turbine 940. The remainder of the system operates the same.

Figure 15A:
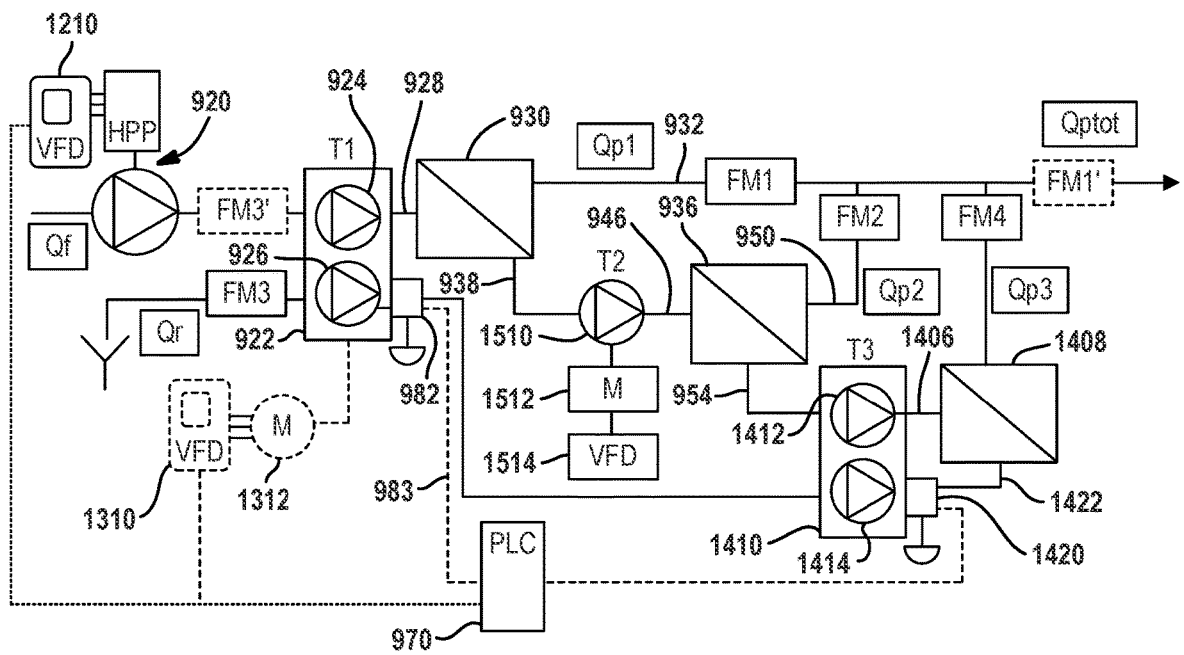
FIG. 15A is a block diagrammatic view of a fifth example of a reverse osmosis system having multiple stages according to the present disclosure.

As mentioned above, the turbine T2 may be eliminated and thus the brine outlet 938 may be coupled to the inlet 946 of the pressure vessel 936 and the turbine 1414 may be coupled directly to the turbine 926. In systems with more than three pressure vessels, the number of turbines may be changed to correspond to the amount of brine pressure and inlet pressures at each of the stages. In some situations, a motor may be desired to be used as set forth below Referring now to FIG. 15A, a pump 1510 coupled to a motor 1512 and a variable frequency drive 1514 may be used to replace the turbocharger 940 illustrated in FIG. 14. That is, by controlling the frequency of the turbocharger, the desired inlet pressure to one or more pressure vessels may be increased to allow the system to ultimately generate the desired amount of brine and permeate. In systems with more than three stages, some stages may have no turbocharger or pump while some stages may include a pump like 1510 between two pressure vessels. As is illustrated in FIG. 15, the brine thus bypasses the pump 1510 and the brine from two consecutive turbochargers are thus connected together and ultimately provide the overall brine outlet Qr.

Referring now to FIG. 15B, "X" refers to a stage. X=1 for the first stage, X=2 for the second stage and so on. As mentioned above, a number of stages may be provided. The turbocharger T1 is located between the high pressure pump and stage 1. TX represents each successive turbostages wherein T2 is between stages 1 and 2 and T3 is between stages 2 and 3, etc. The target values for the final stage of brine flow QrX and permeate flow per stage QpX and the logic is summarized in FIG. 15B.

The variable frequency drive is adjusted in the control loop 1 to reach the set point of the total permeate production Qptot. A higher speed for more permeate and lower speed is provided for less permeate. In the second loop, the actuator is adjusted to reach the set point for QpX. The T1 actuator, or the first actuator, is adjusted to reach the set point for QrX for the brine flow through the final stage. That is, in the first control loop, an increase or decrease of the frequency of the high pressure pump decreases or increases the speed and pressure of the high speed pump accordingly. The turbine nozzle settings in the various stages are opened or closed to increase or decrease the brine pressure. With respect to the final stage, the actuator is commanded to be open or closed for the turbine 926. The brine pressure is increased when the turbine nozzle is closed and decreases when the turbine nozzle is open. Each of the middle stages corresponds to "control loop X" and be controlled accordingly.

The high pressure pump for all of the examples set forth may be adjusted for various conditions such as the feed temperature. A colder feed temperature requires more pressure for a given Qptot. Likewise, the feed salinity may change the high pressure pump speed. Higher salinity requires more pressure for a given Qptot. When the membrane begins to foul over time, more pressure is required at the high pressure pump for a given quantity of permeate output Qptot. Also, merely sitting a higher permeate production requirement will require a higher pressure.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A turbocharger comprising:
   a turbocharger housing having an impeller housing comprising a circular cross-section;
   a main nozzle disposed within the turbocharger housing communicating a first portion of a fluid stream to a first volute;
   a first auxiliary channel and a first auxiliary nozzle communicating a second portion of the fluid stream to the first volute, said first auxiliary nozzle downstream of the main nozzle;
   a second auxiliary channel and a second auxiliary nozzle communicating a third portion of the fluid stream to the first volute, said second auxiliary nozzle downstream of the first auxiliary nozzle; and
   a valve assembly selectively coupling the first auxiliary channel to the first auxiliary nozzle and the second auxiliary channel to the second auxiliary nozzle.

2. The turbocharger as recited in claim 1 wherein the first auxiliary nozzle is about ninety degrees from the main nozzle.

3. The turbocharger as recited in claim 1 wherein the second auxiliary nozzle is about ninety degrees from the first auxiliary nozzle.

4. The turbocharger as recited in claim 1 wherein the first auxiliary nozzle is about tangential to the circular cross-section of the impeller housing.

5. The turbocharger as recited in claim 1 wherein the first auxiliary nozzle and the second auxiliary nozzle are tangential to the circular cross-section.

6. The turbocharger as recited in claim 1 wherein a first effective area of the main nozzle is greater than a second effective area of the first auxiliary nozzle.

7. The turbocharger as recited in claim 6 wherein the second effective area is greater than a third effective area of the second auxiliary nozzle.

8. The turbocharger as recited in claim 7 wherein the third effective area is greater than a fourth effective area of a third auxiliary nozzle.

9. The turbocharger as recited in claim 1 further comprising a first valve stem forming a first valve in the first auxiliary channel and a second valve in the second auxiliary channel.

10. The turbocharger as recited in claim 9 wherein the first valve stem comprises a first port coupled therethrough so that when the first auxiliary nozzle is partially opened, the second portion and the third portion of the fluid stream is communicated to the first volute.

11. The turbocharger as recited in claim 1 further comprising a first valve stem simultaneously opening the first auxiliary channel and the second auxiliary channel.

12. The turbocharger as recited in claim 1 wherein the main nozzle is perpendicular to the first auxiliary nozzle and the main nozzle is parallel to the second auxiliary nozzle.

13. The turbocharger as recited in claim 1 wherein the second auxiliary channel is disposed within the turbocharger housing.

14. The turbocharger as recited in claim 1 wherein the second auxiliary channel is disposed at least partially external to the turbocharger housing.

15. The turbocharger as recited in claim 1 further comprising a third auxiliary channel and a third auxiliary nozzle communicating a fourth portion of the fluid stream to the first volute, said third auxiliary nozzle downstream of the second auxiliary nozzle.

16. The turbocharger as recited in claim 15 wherein the third auxiliary nozzle is tangential to the circular cross-section.

17. The turbocharger as recited in claim 15 wherein the third auxiliary nozzle is about 90 degrees downstream of the second auxiliary nozzle.

18. The turbocharger as recited in claim 15 wherein a first effective area of the main nozzle is greater than a second effective area of the first auxiliary nozzle, the second effective area is greater than a third effective area of the second auxiliary nozzle and the third effective area is greater a fourth effective area of the third auxiliary nozzle.

19. The turbocharger as recited in claim 15 further comprising a first valve stem simultaneously opening the first auxiliary channel, the second auxiliary channel and the third auxiliary channel.

20. The turbocharger as recited in claim 15 further comprising a first valve stem selectively closing the first auxiliary channel, a second valve stem selectively closing the second auxiliary channel and a third valve stem selectively closing the third auxiliary channel.

21. The turbocharger as recited in claim 20 wherein said first valve stem, said second valve stem and the third valve stem are independently controllable using the controller.

22. The turbocharger as recited in claim 15 further comprising a first valve stem comprising a first port and a second port coupled therethrough so that when the first auxiliary nozzle is partially opened, the third portion of the fluid stream is communicated to the second auxiliary nozzle and the fourth portion of the fluid stream is communicated to a third auxiliary nozzle.

23. The turbocharger as recited in claim 22 wherein the first port and the second port open simultaneously.

24. The turbocharger as recited in claim 23 wherein the first port opens before the second port.

25. The turbocharger as recited in claim 1 further comprising a first valve stem selectively closing the first auxiliary nozzle, a second valve stem selectively closing the second auxiliary channel and a third valve stem selectively closing a third auxiliary nozzle.

26. The turbocharger as recited in claim 25 wherein said first valve stem, said second valve stem and the third valve stem are independently controllable.

27. A reverse osmosis system comprising:
   a first membrane array configured to receive a feed stream and to generate a first permeate stream and a first brine stream from the feed stream;
   a second membrane array configured to receive the first brine stream and to generate a second permeate stream and a second brine stream from the first brine stream;
   a turbocharger comprising
      a turbocharger housing having an impeller housing comprising a circular cross-section;

a main nozzle disposed within the turbocharger housing communicating a first portion of a fluid stream to a first volute;

a first auxiliary channel and a first auxiliary nozzle communicating a second portion of the fluid stream to the first volute, said first auxiliary nozzle downstream of the main nozzle;

a second auxiliary channel and a second auxiliary nozzle communicating a third portion of the fluid stream to the first volute, said second auxiliary nozzle downstream of the first auxiliary nozzle; and a valve assembly selectively coupling the first auxiliary channel to the first auxiliary nozzle and the second auxiliary channel to the second auxiliary nozzle;

a first flowmeter generating a first flow signal corresponding to a first flow of the first permeate stream;

a second flowmeter generating a second flow signal corresponding to a second flow of the second permeate stream;

a third flowmeter generating a third flow signal corresponding to a third flow of the second brine stream; and a controller in communication with the first flowmeter, the second flowmeter and the third flowmeter, said controller controlling the valve assembly in response to the first flow signal, the second flow signal and the third flow signal.

28. A method for operating a reverse osmosis system comprising:

directing a feed stream to a first membrane array to separate the feed stream into a first permeate stream and a first brine stream;

directing the first brine stream to a second membrane array to separate the first brine stream into a second permeate stream and a second brine stream;

determining a first flow signal corresponding to a first flow in the first permeate stream;

determining a second flow signal corresponding to a second flow in the second permeate stream;

determining a third flow signal corresponding to a third flow in the second brine stream;

determining a first auxiliary nozzle valve setting of a first turbocharger and a second auxiliary nozzle valve setting of the first turbocharger in response to the first flow signal and the third flow signal;

determining a third auxiliary nozzle valve setting of a second turbocharger and a fourth auxiliary nozzle valve setting of the second turbocharger in response to the second flow signal and the third flow signal; and controlling a torque output of a motor-generator coupled to the first turbocharger to adjust an amount by which the first turbocharger increases a pressure of at least one of the feed stream and the first brine stream in response to the first flow signal.

* * * * *